US00RE50868E

(19) United States
(12) Reissued Patent
Lee et al.

(10) Patent Number: US RE50,868 E
(45) Date of Reissued Patent: Apr. 14, 2026

(54) METHOD OF PROVIDING NOTIFICATION AND ELECTRONIC DEVICE SUPPORTING SAME

(71) Applicant: SAMSUNG ELECTRONICS CO., LTD., Suwon-si (KR)

(72) Inventors: Seyeong Lee, Suwon-si (KR); Dongwook Seo, Suwon-si (KR); Myeongjin Oh, Suwon-si (KR); Seonghun Moon, Suwon-si (KR); Seongmin Je, Suwon-si (KR)

(73) Assignee: Samsung Electronics Co., Ltd., Suwon-si (KR)

(21) Appl. No.: 17/871,312

(22) Filed: Jul. 22, 2022

Related U.S. Patent Documents

Reissue of:
(64) Patent No.: 11,032,099
Issued: Jun. 8, 2021
Appl. No.: 16/244,342
Filed: Jan. 10, 2019

(30) Foreign Application Priority Data

Jan. 11, 2018 (KR) ..... 10-2018-003716

(51) Int. Cl.
*H04L 12/28* (2006.01)
*H04L 9/08* (2006.01)
*H04W 4/029* (2018.01)

(52) U.S. Cl.
CPC ..... *H04L 12/2825* (2013.01); *H04L 9/0833* (2013.01); *H04L 9/0841* (2013.01); (Continued)

(58) Field of Classification Search
CPC ..... H04L 12/2818; H04L 12/2812; H04L 12/2825; H04L 9/0833; H04L 9/0841; H04W 4/029
See application file for complete search history.

(56) References Cited

U.S. PATENT DOCUMENTS 9,721,441 B2 8/2017 Lee et al.
9,781,602 B1 * 10/2017 Girdhar ..... H04W 4/021
(Continued)

FOREIGN PATENT DOCUMENTS

CN 105308657 A 2/2016
CN 105471682 A 4/2016
(Continued)

OTHER PUBLICATIONS

Korean Notice of Patent Grant dated Jun. 19, 2023 for Application No. KR10-2021-0132536.
(Continued)

*Primary Examiner* — Joshua D Campbell
(74) *Attorney, Agent, or Firm* — Nixon & Vanderhye P.C.

(57) ABSTRACT

Disclosed is an electronic device including: a communication interface comprising communication circuitry; a processor electrically connected to the communication interface; and a memory electrically connected to the processor, wherein the memory stores instructions which, when executed by the processor, cause the electronic device to: receive information on a status of at least one external device, information related to a location of the electronic device, and information related to a location of at least one external electronic device from a server through the communication interface; identify whether to output the status of the at least one external device based at least in part on the information related to the location of the electronic device and the information related to the location of the at least one external electronic device; and output the status of the at least one external device in response to identification of the output of the status of the at least one external device.

28 Claims, 15 Drawing Sheets

200

(52) U.S. Cl.
CPC ..... *H04L 12/2812* (2013.01); *H04L 12/2818* (2013.01); *H04W 4/029* (2018.02)

(56) References Cited

U.S. PATENT DOCUMENTS

| | | | | |
|---|---|---|---|---|
| 9,801,009 | B2 | 10/2017 | Shim et al. | |
| 9,842,481 | B1 * | 12/2017 | Yamazaki | H04L 43/106 |
| 10,304,319 | B2 | 5/2019 | Sager et al. | |
| 2010/0325194 | A1 * | 12/2010 | Williamson | H04W 4/029 709/203 |
| 2012/0019722 | A1 | 1/2012 | Kwisthout et al. | |
| 2013/0106613 | A1 * | 5/2013 | Lee | H04L 67/125 340/691.3 |
| 2015/0006695 | A1 * | 1/2015 | Gupta | H04W 4/70 709/223 |
| 2015/0134761 | A1 * | 5/2015 | Sharma | H04L 67/55 709/204 |
| 2015/0194027 | A1 * | 7/2015 | Lee | H04W 4/021 340/540 |
| 2016/0012707 | A1 | 1/2016 | McKinley et al. | |
| 2016/0073482 | A1 * | 3/2016 | Fok | H04L 12/282 315/294 |
| 2016/0098309 | A1 * | 4/2016 | Kim | G06F 11/1441 714/47.1 |
| 2016/0112268 | A1 * | 4/2016 | Chung | H04L 45/26 370/254 |
| 2016/0139752 | A1 * | 5/2016 | Shim | G06F 3/04817 715/771 |
| 2016/0150357 | A1 * | 5/2016 | Jung | H04W 4/80 455/41.1 |
| 2016/0379165 | A1 * | 12/2016 | Moakley | H04W 4/029 705/333 |
| 2017/0064412 | A1 | 3/2017 | Taxier | |
| 2017/0105095 | A1 * | 4/2017 | Um | H04W 4/70 |
| 2017/0105190 | A1 * | 4/2017 | Logan | H04M 19/047 |
| 2017/0134553 | A1 * | 5/2017 | Jeon | G06F 3/04886 |
| 2017/0168667 | A1 * | 6/2017 | Jeon | G06F 3/165 |
| 2017/0171178 | A1 * | 6/2017 | Reynders | G06Q 20/145 |
| 2017/0171204 | A1 * | 6/2017 | Forood | H04W 4/80 |
| 2017/0171778 | A1 * | 6/2017 | Britt | H04W 28/10 |
| 2017/0180340 | A1 * | 6/2017 | Smith | H04W 4/70 |
| 2017/0180789 | A1 | 6/2017 | Wright et al. | |
| 2017/0231015 | A1 | 8/2017 | Jang et al. | |
| 2018/0020329 | A1 * | 1/2018 | Smith | G01S 5/0289 |
| 2018/0167908 | A1 * | 6/2018 | Kotreka | H04W 4/029 |
| 2018/0352427 | A1 * | 12/2018 | Weber | H04W 12/02 |
| 2019/0044826 | A1 * | 2/2019 | Flores Guerra | H04L 41/082 |
| 2019/0081857 | A1 * | 3/2019 | Demetriou | H04L 41/0816 |
| 2019/0121497 | A1 * | 4/2019 | Tov | H04W 4/023 |
| 2019/0122526 | A1 * | 4/2019 | Agnihotri | G06F 40/205 |
| 2019/0394063 | A1 * | 12/2019 | Cho | H04L 12/2825 |
| 2020/0195518 | A1 * | 6/2020 | Sugaya | G06K 9/00671 |

FOREIGN PATENT DOCUMENTS

| | | | |
|---|---|---|---|
| CN | 105490899 | A | 4/2016 |
| CN | 105518578 | A | 4/2016 |
| CN | 3 101 881 | A1 | 12/2016 |
| CN | 106254621 | A | 12/2016 |
| CN | 106789469 | A | 5/2017 |
| CN | 107018195 | A | 8/2017 |
| EP | 2 772 009 | A1 | 9/2014 |
| EP | 3101881 | A1 | 12/2016 |
| EP | 2017-084174 | | 5/2017 |
| JP | 2015-143948 | A | 8/2015 |
| JP | 2016-10001 | A | 1/2016 |
| JP | 2017-084174 | A | 5/2017 |
| KR | 10-2017-0073904 | | 6/2017 |
| WO | WO 2008/155601 | | 12/2008 |
| WO | WO 2013/062371 | A1 | 5/2013 |
| WO | WO 2013/120225 | | 8/2013 |

OTHER PUBLICATIONS

Chinese Decision of Rejection for CN 201980007737.7 issued Jul. 1, 2022.
Chinese Office Action for CN 201980007737.7 issued Apr. 2, 2022.
Chinese Office Action for CN 201980007737.7 issued Dec. 21, 2021.
India Office Action for India Application No. 202017027612 issued May 23, 2022.
Korean Office Action for KR 10-2018-0003716 issued Jan. 27, 2022.
Korean Office Action for KR 10-2021-0132536 issued May 17, 2022.
European Office Action dated Sep. 1, 2022 for EP Application No. 19738120.5.
Anonymous: "Radio beacon—Wikipedia", Nov. 5, 2017, pp. 1-6, XP055955467.
Korean Notice of Final Reiection dated Jul. 28, 2022 for KR Application No. 10-2018-0003716.
Chinese Notice of Allowance dated Jan. 13, 2023 for CN Application No. 201980007737.7.
Search Report and Written Opinion dated Apr. 23, 2019 in counterpart International Patent Application No. PCT/KR2019/000388.
Extended European Search Report dated Nov. 16, 2020 for EP Application No. 19738120.5.
Chinese Office Action dated Mar. 25, 2021 for CN Application No. 201980007737.7.

* cited by examiner

METHOD OF PROVIDING NOTIFICATION AND ELECTRONIC DEVICE SUPPORTING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application is based on and claims priority under 35 U.S.C. § 119 to Korean Patent Application No. 10-2018-0003716, filed on Jan. 11, 2018, in the Korean Intellectual Property Office, the disclosure of which is incorporated by reference herein in its entirety.

BACKGROUND

1) Field

The present disclosure relates to a method of providing a notification and an electronic device supporting the same.

2) Description of Related Art

With the development of Internet of Things (IoT) technology for accessing the Internet through a sensor function and a communication function included in various items, various types of IoT devices providing various services have rapidly proliferated.

A user of an electronic device may install an application for managing an IoT device in the electronic device and registering the IoT device, thereby controlling a function of the IoT device or receiving information on the status of the IoT device from the IoT device.

The above information is presented as background information only to assist with an understanding of the present disclosure. No determination has been made, and no assertion is made, as to whether any of the above might be applicable as prior art with regard to the present disclosure.

An electronic device may receive a notification of information on a change in the status of an IoT device from the IoT device whenever a change in the status of the IoT device occurs. When a user of the electronic device does not need to receive (or identify) the notification of the change in the status of the IoT device or even when the user is unable to receive the notification (notification is not possible), the electronic device may receive the notification of the change in the status of the IoT device from the IoT device. In this case, the information may be considered unnecessary by the user of the electronic device, and a high frequency of generated notifications may be difficult to read and thus unnoticeable.

SUMMARY

Various embodiments of the present disclosure relate to a method of providing a notification for selectively providing information on a change in the status of an IoT device to a user of an electronic device based on information on locations of the electronic device and another electronic device for controlling the IoT device and an electronic device for supporting the same.

The present disclosure may not be limited to the above mentioned aspects and features, and other aspects and features which are not mentioned may be clearly understood, through the following descriptions, by those skilled in the art of the present disclosure.

In accordance with an aspect of the present disclosure, an electronic device is provided. The electronic device may include: a communication interface comprising communication circuitry; a processor electrically connected to the communication interface; and a memory electrically connected to the processor, wherein the memory stores instructions which, when executed by the processor, cause the electronic device: to receive information on a status of at least one external device, information related to a location of the electronic device, and information related to a location of at least one external electronic device from a server through the communication interface; identify whether to output the status of the at least one external device based at least in part on the information related to the location of the electronic device and the information related to the location of the at least one external electronic device; and output the status of the at least one external device in response to identification of the output of the status of the at least one external device.

In accordance with another aspect of the present disclosure, a method of providing a notification by an electronic device is provided. The method includes: receiving information on a status of at least one external device, information related to a location of the electronic device, and information related to a location of at least one external electronic device from a server; identifying whether to output the status of the at least one external device based at least in part on the information related to the location of the electronic device and the information related to the location of the at least one external electronic device; and outputting the status of the at least one external device in response to identification of the output of the status of the at least one external device.

A method of providing a notification and an electronic device for supporting the same according to various example embodiments of the present disclosure can selectively provide information on a change in a status of an IoT device to a user of an electronic device based on information on locations of the electronic device and another electronic device for controlling the IoT device. Accordingly, the user may act appropriately without missing an important change in the status of the IoT device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
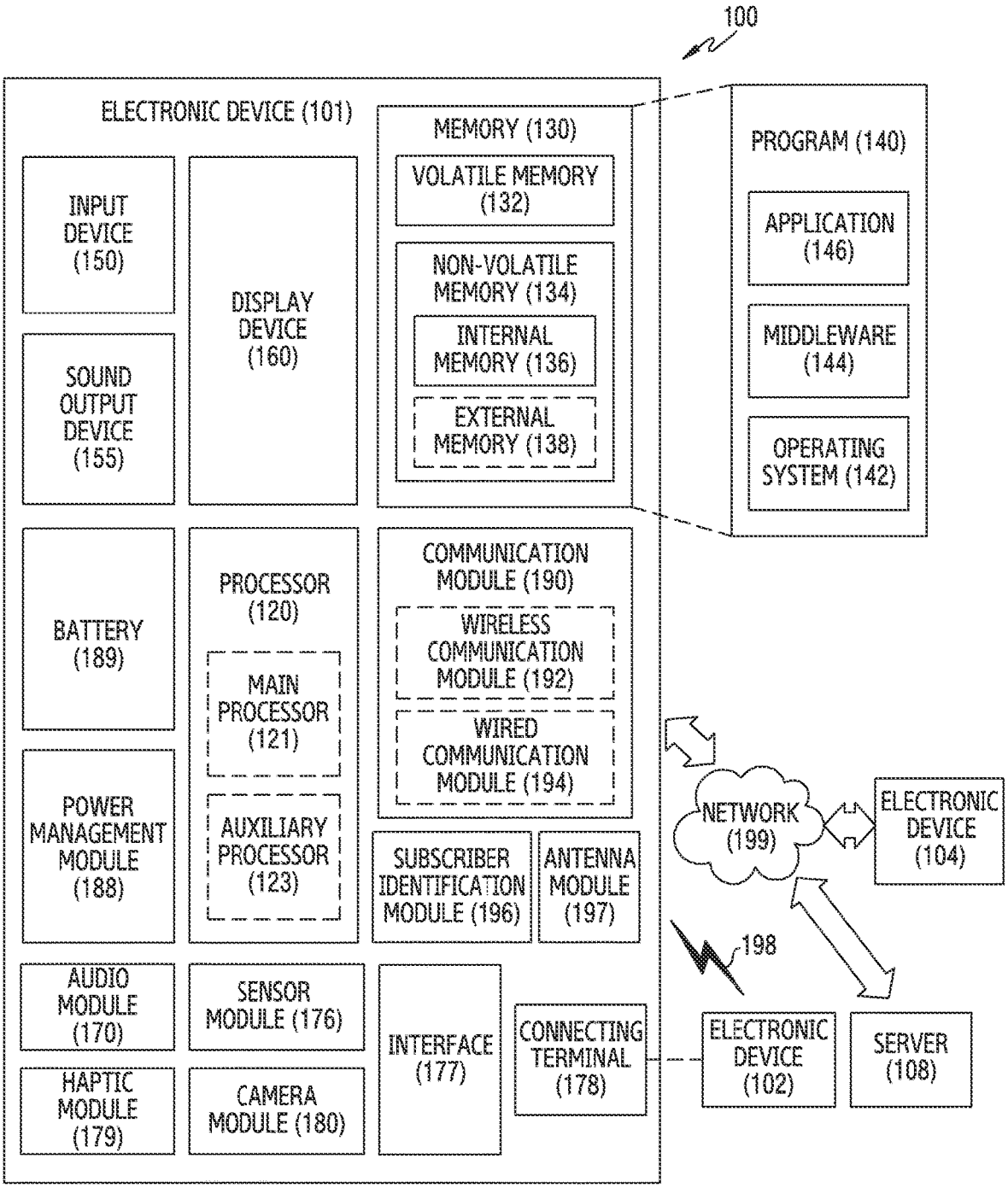
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120 and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements. With regard to the description of the drawings, similar reference numerals may be used to refer to similar or related elements. It is to be understood that a singular form corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, and/or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to embodiments of the present disclosure is not limited to the above-described devices.

The embodiments and the terms used therein are not intended to limit the disclosure to specific forms, and should be understood to include various modifications, equivalents, and/or alternatives to the corresponding embodiments. In describing the drawings, similar reference numerals may be used to designate similar constituent elements.

The term "module" or the ending of a word, such as "or", "er", or the like may refer, for example, to a unit of processing at least one function or operation, and this may be embodied by hardware, software, or any combination of hardware and software. These terms are illustrated for convenience of illustration. Accordingly, the present disclosure is not limited to the following terms and other terms having the same technical meaning may be used.

Figure 2:
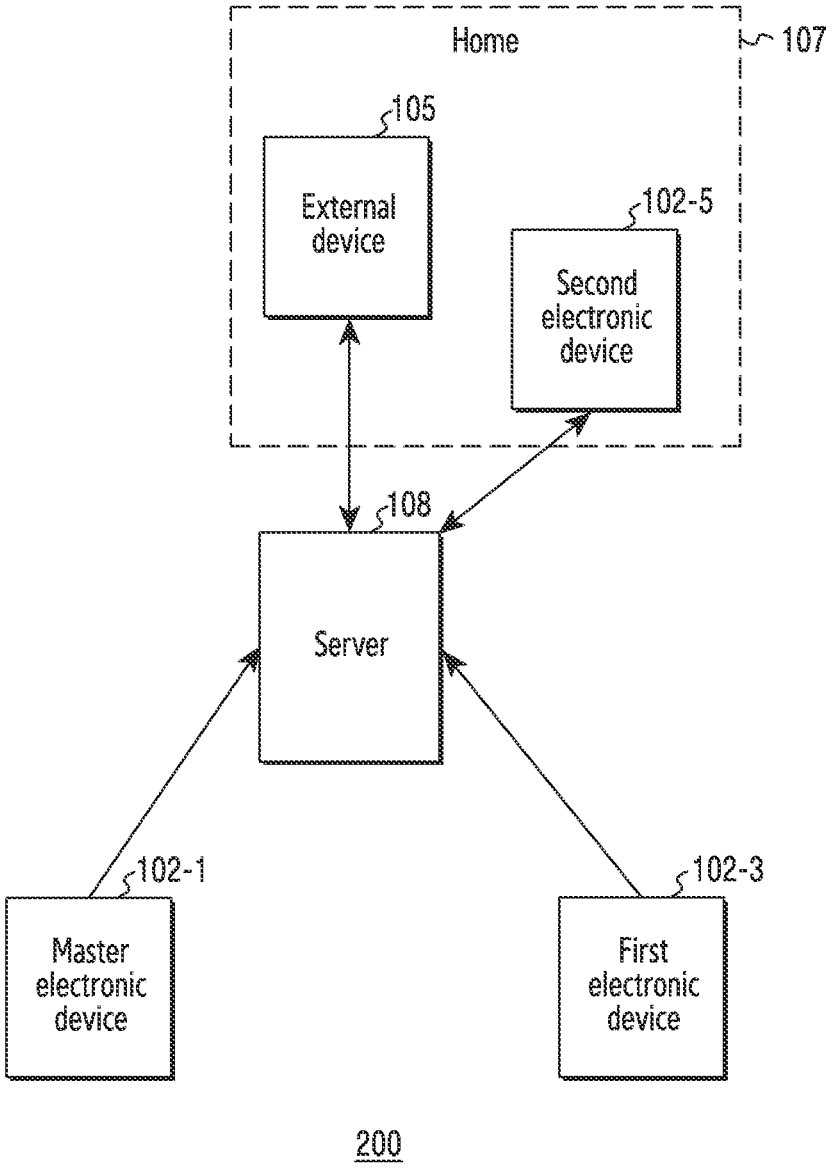
FIG. 2 is a diagram illustrating a system for describing a method of providing a notification according to various embodiments of the present disclosure.

FIG. 2 is a diagram illustrating a system for describing a method of providing a notification according to various embodiments of the present disclosure.

Referring to FIG. 2, a system 200 may include an external device 105, a master electronic device 102-1, a first electronic device 102-3, a second electronic device 102-5, and a server 108.

According to an embodiment, the external device 105 may be a device (or an IoT device) which can be controlled by at least one of the master electronic device 102-1, the first electronic device 102-3, and the second electronic device 102-5. According to an embodiment, the external device 105 may be a device disposed (or positioned) within a fixed area (or a fixed place). For example, and without limitation, the external device 105 may include a door lock, a television, a Closed-Circuit Television (CCTV), a refrigerator, a washing machine, an air conditioner, a window, a bulb, an oven, or the like, within a home 107. However, the external device 105 is not limited thereto. For example, the external device 105 may be disposed in various places (for example, an office) other than a home 107, and may include various types of devices.

According to an embodiment, the external device 105 may be a device that can directly perform wireless communication with the server 108 or perform wireless communication with the server 108 through a relay device (or a hub device) (for example, an access point or a wireless router). According to an embodiment, the external device 105 may be a device that can be registered in the server 108. The external device 105 may be a device which is registered in the server 108 and thus can be controlled by at least one of the master electronic device 102-1, the first electronic device 102-3, or the second electronic device 102-5. According to an embodiment, the external device 105 may be a device which is registered in the server 108 and thus can provide information on the status of the external device 105 to at least one of the master electronic device 102-1, the first electronic device 102-3, or the second electronic device 102-5.

According to an embodiment, in the case in which the external device 105 is a door lock, when the door lock is closed and then opened, the status of the door lock may be changed and information on the status of the door lock (the external device 105) may be provided. According to an embodiment, the information on the status of the external device 105 may include information on a status change (or occurrence of an event) made in the external device 105. The information on the status of the external device 105 may include information on a change in a function performed by the external device 105. For example, when the external device 105 is a refrigerator, the information on the status of the external device 105 may include information on window opening, window closing, or temperature control of the refrigerator. In another embodiment, when the external device 105 is a television, the information on the status of the external device 105 may include information on a channel change, turning on/off, or volume control. In another example, the information on the status of the external device 105 may include information (for example, communication connection or communication disconnection) related to a communication connection between the external device 105 and another device. According to an embodiment, when at least one of the master electronic device 102-1, the first electronic device 102-3, and the second electronic device 102-5 transmits a control signal (or a control command) to the external device 105, the information on the status of the external device 105 may include a response to the control signal (or information on the response). For example, when the external device 105 (for example, the television) receives a control signal (for example, a signal for turning on the television) from the master electronic device 102-1, the external device 105 may perform a function (for example, a function of turning on power of the television) corresponding to the control signal and then transmit information indicating completion of execution of the function. However, the response to the control signal is not limited thereto.

According to an embodiment, the master electronic device may register the external device 105 in the server 108 based on an account of the user of the master electronic device 102-1 (or may be an electronic device capable of registering the external device 105 in the server 108). According to an embodiment, the master electronic device 102-1 may register the external device 105 in the server 108 in order to manage the external device 105 through an application for managing the external device 105 (for example, for controlling the external device 105 or receiving information on the status of the external device 105 from the external device 105). For example, the master electronic device 102-1 may receive user input for selecting at least one external device from among external devices that the master electronic device 102-1 can manage while executing the application for managing the external device 105. The master electronic device 102-1 may register at least one external device selected by user input in the server 108.

According to an embodiment, the master electronic device 102-1 may set at least one group (hereinafter, referred to as an "external device 105 group") including at least one external device 105 selected by the user input and register the set external device 105 group in the server 108. For example, the master electronic device 102-1 may set a first external device group including the external device 105 disposed within the home 107 and a second external device group including an external device disposed within an office and may register the generated first external device group and second external device group in the server 108. According to an embodiment, the master electronic device 102-1 may simultaneously control a plurality of external devices included in an external device group. For example, the master electronic device 102-1 may configure a plurality of external devices included in an external device group to be simultaneously turned off at a predetermined time point (for example, 10 p.m.). However, the operation in which the master electronic device 102-1 simultaneously controls the plurality of external devices included in the external device group is not limited thereto.

According to an embodiment, the master electronic device 102-1 may register the first electronic device 102-3 (or a user account of the first electronic device 102-3) and the second electronic device 102-5 (or a user account of the second electronic device 102-5) in the server 108. The master electronic device 102-1 may assign a right (hereinafter, referred to as a "control right") for controlling the external device 105 to the first electronic device 102-3 and the second electronic device 102-5. Each of the first electronic device 102-3 and the second electronic device 102-5 assigned the control right from the master electronic device 102-1 may perform a predetermined registration procedure with the server 108 through an application for controlling the external device 105 based on the user account, thereby being registered in the server 108.

According to an embodiment, the master electronic device 102-1 may assign a control right for a plurality of external devices registered in the server 108 to both the first electronic device 102-3 and the second electronic device 102-5.

According to an embodiment, the master electronic device 102-1 may assign the control right for at least some of the plurality of external devices registered in the server 108 to the first electronic device 102-3 and the second electronic device 102-5. For example, when a plurality of external devices is registered in the server 108, the master electronic device 102-1 may assign a control right for a first external device to the first electronic device 102-3 and a control right for a second external device to the second electronic device 102-5.

According to an embodiment, when a plurality of external device groups is registered, the master electronic device 102-1 may assign a control right for at least one (or at least some) of a plurality of external devices included in some of the plurality of external device groups to the first electronic device 102-3 and the second electronic device 102-5. For example, the master electronic device 102-1 may assign a control right for a first external device group to the first electronic device 102-3 and a control right for a second external device group to the second electronic device 102-5. In another example, the master electronic device 102-1 may assign a control right for a first external device among a plurality of external devices included in a first external device group to the first electronic device 102-3 and a control right for a second external device among a plurality of external devices included in a second external device group to the second electronic device 102-5.

According to an embodiment, the master electronic device 102-1 may include a group for the first electronic device 102-3 and the second electronic device 102-5 (hereinafter, referred to as an "electronic device group") and register the configured device group in the server 108. For example, the master electronic device 102-1 may register a first electronic device group including the master electronic device 102-1 and the first electronic device 102-3 in the server 108. In another example, the master electronic device 102-1 may register a second electronic device group including the master electronic device 102-1, the first electronic device 102-3, and the second electronic device 102-5 in the server 108.

According to an embodiment, the master electronic device 102-1 may assign different control rights for external electronic devices to respective electronic device groups. For example, with respect to a first electronic device group, the master electronic device 102-1 may assign a control right for a first external device (or a first external device group) to the first electronic device 102-3 included in the first electronic device group. With respect to a second electronic device group, the master electronic device 102-1 may assign a control right for a second external device (or a second external device group) to the first electronic device 102-3 and the second electronic device 102-5 included in the second electronic device group.

According to an embodiment, the master electronic device 102-1 may assign different control rights for external devices to a plurality of electronic devices included in the same electronic device group. For example, when the first electronic device 102-3 and the second electronic device 102-5 are included in the second electronic device group, the master electronic device 102-1 may assign a control right for a first external device to the first electronic device 102-3 and a control right for a second external device to the second electronic device 102-5.

According to an embodiment, when the first electronic device 102-3 and the second electronic device 102-5 receive the control right from the master electronic device 102-1, the first electronic device 102-3 and the second electronic device 102-5 may perform a predetermined registration procedure with the server 108 using the user account and thus may be registered in the server 108. According to an embodiment, when the first electronic device 102-3 and the second electronic device 102-5 are registered in the server 108, the first electronic device 102-3 and the second electronic device 102-5 may control the external device 105. For example, when the first electronic device 102-3 and the second electronic device 102-5 are registered in the server 108, the first electronic device 102-3 and the second electronic device 102-5 may control the external device 105 and may receive information on a change in a status of the external device 105 from the external device 105.

Hereinafter, for convenience of description, it is assumed that the first electronic device 102-3 and the second electronic device 102-5 are registered in the server 108.

According to an embodiment, the electronic devices 102-1, 102-3, and 102-5 may receive information on the status of the external device 105. For example, the electronic devices 102-1, 102-3, and 102-5 may receive information indicating a change in the status of the external device 105 from the external device 105 through the server 108.

According to an embodiment, the electronic devices 102-1, 102-3, and 102-5 may identify whether to output the received status of the external device 105 based on at least a predetermined configuration (reference or policy). For example, the electronic devices 102-1, 102-3, and 102-5 may identify (determine) whether to output the received status of the external device 105 based on at least a predetermined condition.

According to an embodiment, the electronic devices 102-1, 102-3, and 102-5 may identify whether to output the status (or the change in the status) of the external device 105 based at least partly on information related to locations of the electronic devices 102-1, 102-3, and 102-5. According to an embodiment, the information related to the locations may include at least one piece of information on the current locations of the electronic devices 102-1, 102-3, and 102-5, distances between the locations of the electronic devices 102-1, 102-3, and 102-5 and the location of the external device 105 (or the place in which the external device 105 is disposed), and information indicating that at least part of the electronic devices 102-1, 102-3, and 102-5 is positioned in a predetermined area (for example, within a home). According to an embodiment, the electronic devices 102-1, 102-3, and 102-5 may receive the information related to the locations of the electronic devices 102-1, 102-3, and 102-5 from the server 108 together with the information on the status of the external device 105.

According to an embodiment, based at least partly on the received information related to the locations of the electronic devices 102-1, 102-3, and 102-5, each of the electronic devices 102-1, 102-3, and 102-5 may identify the electronic device that is the closest to the external device 105 among the electronic devices 102-1, 102-3, and 102-5. Each of the electronic devices 102-1, 102-3, and 102-5 may or may not output the status of the external device 105 according to a configuration for allowing only the electronic device closest to the external device 105 to output the information on the status of the external device 105 or a configuration for allowing only the electronic device positioned within a predetermined area to output the information on the status of the external device 105. For example, when the first electronic device 102-3 identifies that the first electronic device 102-3 is the closest to the external device 105 among the master electronic device 102-1, the first electronic device 102-3, and the second electronic device 102-5, only the first electronic device 102-3 may output the status of the external device 105. In another example, when the first electronic device 102-3 identifies that the second electronic device 102-5 is the closest to the external device 105 among the master electronic device 102-1, the first electronic device

102-3, and the second electronic device 102-5, the first electronic device 102-3 may not output the status of the external device 105. However, this is only an example, and a more detailed description will be provided below.

According to an embodiment, each of the electronic devices 102-1, 102-3, and 102-5 may encrypt information related to the location of each of the electronic devices 102-1, 102-3, and 102-5 and transmit the encrypted information to the server 108. According to an embodiment, each of the electronic devices 102-1, 102-3, and 102-5 may receive encrypted information related to the locations of the electronic devices 102-1, 102-3, and 102-5 from the server 108. According to an embodiment, each of the electronic devices 102-1, 102-3, and 102-5 may decrypt the encrypted information related to the locations of the electronic devices 102-1, 102-3, and 102-5 through a symmetric key shared (or stored in common) between the electronic devices 102-1, 102-3, and 102-5. Operations of encrypting and decrypting the information related to the locations of the electronic devices 102-1, 102-3, and 102-5 will be described in greater detail below.

According to an embodiment, the electronic devices 102-1, 102-3, and 102-5 may identify whether to output the status (or a change in the status) of the external device 105 based on at least some of an age, a gender, a position (for example, a superior at the office) or a family role (for example, father) of a user of each of the electronic devices 102-1, 102-3, and 102-5. For example, each of the electronic devices 102-1, 102-3, and 102-5 may or may not output the status of the external device 105 according to a configuration for allowing only the electronic device of the user who is the oldest among the users of the electronic devices 102-1, 102-3, and 102-5 to output the status of the external device 105.

According to an embodiment, the electronic devices 102-1, 102-3, and 102-5 may identify whether to output the status of the external device 105 at least partially based on information indicating whether the electronic device is the master electronic device 102-1. For example, when the master electronic device 102-1 receives information on the status of the external device 105, the master electronic device 102-1 may output the status of the external device 105. Even though the first electronic device 102-3 and the second electronic device 102-5 receive the information on the status of the external device 105, first electronic device 1023 and the second electronic device 102-5 may not output the status of the external device 105.

According to an embodiment, the electronic devices 102-1, 102-3, and 102-5 may identify whether to output the status (or a change in the status) of the external device 105 according to a security level of the external device 105. For example, when a security level set for the external device 105 is high, all of the electronic devices 102-1, 102-3, and 102-5 may output the status of the external device 105 according to a configuration for allowing all of the electronic devices 102-1, 102-3, and 102-5 to output the status of the external device 105. In another example, when the security level set for the external device 105 is low, the electronic devices 102-1, 102-3, and 102-5 may identify whether to output the status (or a change in the status) of the external device 105 according to another configuration (for example, a configuration for outputting the status of the external device 105 at least partially based on information related to the location).

According to an embodiment, the electronic devices 102-1, 102-3, and 102-5 may identify whether to output the status (or the change in the status) of the external device 105 based on at least some of attributes (or an event type) of the status of the external device 105. For example, when the attributes of the status of the external device 105 correspond to completion of the function of the external device 105, the electronic devices 102-1, 102-3, and 102-5 may identify whether to output the status of the external device 105 according to a configuration for allowing only an electronic device (for example, the second electronic device 102-5) positioned within a predetermined area to output the status of the external device 105.

According to an embodiment, when receiving the information on the status of the external device 105, each of the electronic devices 102-1, 102-3, and 102-5 may identify whether to output the status of the external device 105 according to the same configuration (or the same reference or policy) (or by applying the same configuration) among predetermined configurations related to information on whether to output the status of the external device 105. For example, all of the master electronic device 102-1, the first electronic device 102-3, and the second electronic device 102-5 may identify whether to output the status of the external device 105 according to information related to the location based on the same configuration (or reference). According to an embodiment, this is to prevent none of the master electronic device 102-1, the first electronic device 102-3, and the second electronic device 102-5 from outputting the status of the external device 105 if the master electronic device 102-1 identifies whether to output the status of the external device 105 according to a configuration for allowing only the electronic device closest to the external device 105 to output the status of the external device 105 and the first electronic device 102-3 and the second electronic device 102-5 identify whether to output the status of the external device 105 according to a configuration for allowing only the electronic device of the user who is the oldest among the users of the electronic devices to output the status of the external device 105 in the case in which the first electronic device 102-3 is the closest to the external device 105 and the user of the master electronic device 102-1 is the oldest among the users of the electronic devices. According to an embodiment, the master electronic device 102-1 or the server 108 may generate a policy (hereinafter, referred to as a "first policy") for allowing the electronic devices 102-1, 102-3, and 102-5 to identify whether to output the status of the external device 105 (or for outputting the status of the external device 105 according to the same reference) according to the same configuration among predetermined configurations related to information on whether to output the status of the external device 105. According to an embodiment, the master electronic device 102-1 or the server 108 may generate the first policy based on at least part of user input or may automatically generate the first policy based on at least one of a type of the external device 105, a category to which the external device 105 belongs, and a device included in the external device 105.

According to an embodiment, the master electronic device 102-1, the first electronic device 102-3, and the second electronic device 102-5 may receive the generated first policy through the server 108 and store the received first policy in the memory (for example, the memory 130). According to an embodiment, the master electronic device 102-1, the first electronic device 102-3, and the second electronic device 102-5 may receive the generated first policy together with information on the status of the external device 105 through the server 108.

According to an embodiment, each of the electronic devices 102-1, 102-3, and 102-5 may identify whether to output information on the status of the external device 105 in a predetermined order of the electronic devices 102-1, 102-3, and 102-5 based on at least one of information related to the location, age, gender, position, or family role of the user of each of the electronic devices 102-1, 102-3, and 102-5, whether the electronic device is the master electronic device 12-1, the security level set in the external device 105, and attributes of the status of the external device 105. For example, each of the electronic devices 102-1, 102-3, and 102-5 may identify that the electronic devices 102-1, 102-3, and 102-5 sequentially output the status of the external device 105 in the order of the electronic device closest to the external device 105 based at least partially on information related to the location. However, the present disclosure is not limited thereto, and the electronic devices 102-1, 102-3, and 102-5 may identify that the electronic devices 102-1, 102-3, and 102-5 sequentially output the status of the external device 105 in the order of the electronic device farthest from the external device 105 based at least partially on information related to the location. In another example, the master electronic device 102-1 may first output the status of the external device 105 and then the first electronic device 102-3 and the second electronic device 102-5 may identify whether to output the status of the external device 105 after the master electronic device 102-1 outputs the status of the external device 105. However, the present disclosure is not limited thereto.

According to an embodiment, each of the electronic devices 102-1, 102-3, and 102-5 may determine not to output the status of the external device 105 when the electronic device in the previous position in the sequence configured for outputting the status of the external device 105 outputs the status of the external device 105 or receives input for identifying the output status of the external device 105 from the user. According to an embodiment, each of the electronic devices 102-1, 102-3, and 102-5 may determine to output the status of the external device 105 when the preceding electronic device does not output the status of the external device 105 or does not receive input for identifying the output status of the external device 105 from the user.

According to an embodiment, when identifying to output the status of the external device 105, the electronic devices 102-1, 102-3, and 102-5 may identify a scheme for outputting the status of the external device 105. According to an embodiment, the scheme for outputting the status of the external device 105 may be set based on at least one of a type of the external device 105, a security level set in the external device 105, and attributes of the status of the external device 105. For example, when receiving information on a change in a door lock (for example, a change in the door lock from a closed state to an open state), the electronic devices 102-1, 102-3, and 102-5 may simultaneously display the change in the door lock in a pup-up form and output light. In another embodiment, when receiving information on a status change of a bulb (for example, the bulb switches to a turned-on state), the electronic devices 102-1, 102-3, and 102-5 may display the change in the bulb on a quick panel of the electronic devices 102-1, 102-3, and 102-5. However, the scheme for outputting the status of the external device 105 is not limited thereto and a detailed description thereof will be made below.

According to an embodiment, the server 108 may receive information on the status of the external device 105 from the external device 105. According to an embodiment, when the server 108 receives information on the status of the external device 105 from the external device 105, the server 108 may identify whether to transmit the information on the status of the external device 105 from the electronic devices. According to an embodiment, when it is identified that a status change of the external device 105 corresponds to a predetermined pattern, the server 108 may determine not to transmit the information on the status of the external device 105 to the electronic devices 102-1, 102-3, and 102-5. For example, the server 108 may identify a history of the status change of the external device 105, and when it is identified that the currently made status change of the external device 105 corresponds to a regularly made status change of the external device 105 (for example, a status change made every day (or week) at the same time), the server 108 may determine not to transmit the information on the status of the external device 105 to the electronic devices 102-1, 102-3, and 102-5. According to an embodiment, when the server 108 identifies that the status of the external device 105 is changed by a user's (intended) configuration (for example, If This, Then That (IFTTT) or reservation for performing the function of the external device 105), the server 108 may determine not to transmit information on the status of the external device 105 to the electronic devices. Since the case in which the change in the status of the external device 105 corresponds to a predetermined pattern or is made by a user configuration related to the external device 105 is the case in which the users of the electronic devices 102-1, 102-3, and 102-5 can predict the change in the status of the external device 105 or unpredicted damage (or risk) is less likely to be generated by a change in the status of the external device 105, it may be not required to provide information on the status of the external device 105 to the users of the electronic devices 102-1, 102-3, and 102-5. However, the operation in which the server 108 identifies whether to transmit information on the status of the external device 105 to the electronic devices 102-1, 102-3, and 102-5 may be omitted according to an embodiment. According to an embodiment, the server 108 may determine to transmit information on the status of the external device 105 only to the master electronic device 102-1.

According to an embodiment, the server 108 may make a request for information related to the location of the master electronic device 102-1, information related to the location of the first electronic device 102-3, and information related to the location of the second electronic device 102-5 to the master electronic device 102-1, the first electronic device 102-3, and the second electronic device 102-5 in response to reception of the information on the change in the status of the external device 105.

According to an embodiment, the server 108 may receive information related to the location of the master electronic device 102-1 (or encrypted information related to the location of the master electronic device 102-1), information related to the location of the first electronic device 102-3 (or encrypted information related to the location of the first electronic device 102-3), and information related to the location of the second electronic device 102-5 (or encrypted information related to the location of the second electronic device 102-5) from the master electronic device 102-1, the first electronic device 102-3, and the second electronic device 102-5 in response to the request.

According to an embodiment, the server 108 may transmit the information related to the location of the master electronic device 102-1, the information related to the location of the first electronic device 102-3, and the information related to the location of the second electronic device 102-5 to the master electronic device 102-1, the first electronic device 102-3, and the second electronic device 102-5, respectively, together with the information on the status of the external device 105. However, the information which the server 108 transmits to the electronic devices 102-1, 102-3, and 102-5 is not limited thereto. For example, the server 108 may additionally transmit at least one of a security level set in the external device 105, attributes of the status of the external device 105, and a first policy to the electronic devices 102-1, 102-3, and 102-5.

According to an embodiment, the server 108 may perform at least part of the operations of the electronic devices 102-1, 102-3, and 102-5. For example, the server 108 may identify whether to allow the electronic devices 102-1, 102-3, and 102-5 to output the status (or the change in the status) of the external device 105 based on at least one of information related to the locations of the electronic devices 102-1, 102-3, and 102-5, ages, genders, positions, or roles of the users of the electronic devices 102-1, 102-3, and 102-5, whether the electronic device is the master electronic device 102-1, a security level set in the external device 105, and attributes of the status of the external device 105. In another example, the server 108 may designate a scheme in which the electronic devices output the status of the external device 105. A more detailed description of the functions performed by the server 108 will be set forth below.

According to an embodiment, the master electronic device 102-1, the first electronic device 102-3, and the second electronic device 102-5 of FIG. 2 may include at least some elements of the electronic device 102 of FIG. 1.

Hereinafter, a method of providing a notification will be described in greater detail with reference to FIGS. 3 to 15B.

The electronic device 102 according to various embodiments of the present disclosure may include: a communication interface (for example, the communication module 190 including communication circuitry); the processor 120 electrically connected to the communication interface (for example, the communication module 190); and the memory 130 electrically connected to the processor 120, wherein the memory 130 may store instructions which, when executed by the processor 120, may cause the electronic device 102 to: receive information on a status of at least one external device 105, information related to a location of the electronic device 102, and information related to a location of at least one external electronic device from the server 108 through the communication interface (for example, the communication module 190); identify (determine) whether to output the status of the at least one external device 105, based at least in part on the information related to the location of the electronic device 102 and the information related to the location of the at least one external electronic device; and output the status of the at least one external device 105 in response to identification of the output of the status of the at least one external device 105.

According to various embodiments, the instructions when executed by the processor 120 may cause the electronic device to identify whether to output the status of the at least one external device 105, based at least in part on a distance between the location of the electronic device 102 and the location of the at least one external device 105 and a distance between the location of the at least one external electronic device and the location of the at least one external device 105.

According to various embodiments, the instructions may, when executed by the processor 120, cause the electronic device to identify the electronic device 102 or the at least one electronic device closest to the at least one external device 105 and identify that the identified electronic device 102 or at least one electronic device outputs the status of the at least one external device 105.

According to various embodiments, when it is identified that the at least one external electronic device is positioned within a predetermined area including the location of the at least one external device 105, the instructions may, when executed by the processor 120, cause the electronic device to determine not to output the status of the at least one external device 105.

According to various embodiments, the instructions may, when executed by the processor 120, cause the electronic device to identify the sequence in which the electronic device 102 and the at least one external electronic device output the status of the at least one external device 105, based at least in part on the information related to the location of the electronic device 102 and the information related to the location of the at least one external electronic device.

According to various embodiments, the instructions may, when executed by the processor 120, cause the electronic device to identify the sequence in which the at least one external electronic device outputs the status of the at least one external electronic device earlier than the electronic device 102, and when the at least one external electronic device does not output the status of the at least one external device 105 or does not receive input for identifying the output of the status of the at least one external device 105 from a user of the at least one external device 105, identify that the electronic device 102 outputs the status of the at least one external electronic device 105.

According to various embodiments, the instructions may, when executed by the processor 120, cause the electronic device to generate a group master secret key to be shared between the electronic device 102 and the at least one external electronic device, receive a request for the information related to the electronic device 102 from the server 108, generate a group session key through the group master secret key in response to reception of the request, encrypt the information related to the location of the electronic device 102 through the group session key, and control the communication interface to transmit the encrypted information to the server 108.

According to various embodiments, the instructions may, when executed by the processor 120, cause the electronic device to generate the group master secret key through a Group Diffie-Hellman algorithm used by the electronic device 102 and the at least one external electronic device or generate the group master secret key through a parameter generated by one of the electronic device 102 and the at least one external electronic device.

According to various embodiments, the instructions may, when executed by the processor 120, cause the electronic device to identify a scheme for outputting the status of the at least one external electronic device, based at least partially on at least one of a security level set in the at least one external device 105 and attributes of the status of the at least one external device 105.

According to various embodiments, the instructions may, when executed by the processor 120, cause the electronic device to identify whether to output the status of the at least one external device 105, based on at least one of ages, genders, positions, or roles of users of the electronic device 102 and the at least one external electronic device, whether the electronic device 102 is an electronic device capable of assigning a right to manage the at least one external electronic device to the at least one external electronic device, a security level set in the at least one external device 105, and attributes of the status of the external device 105.

Figure 3:
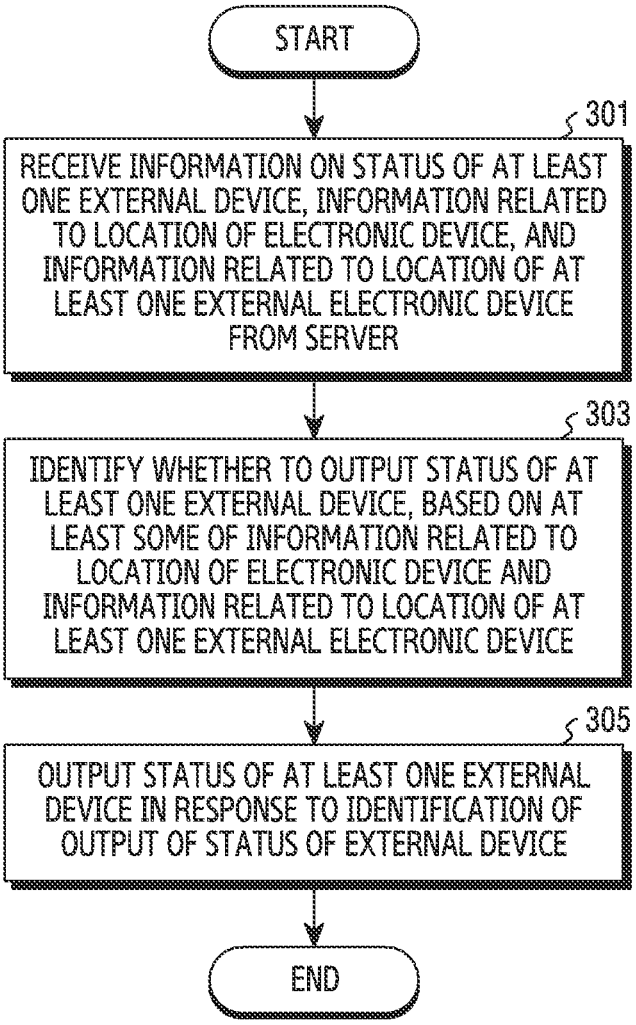
FIG. 3 is a flowchart illustrating an example method by which an electronic device provides a notification based on a change in a status of an external device according to various embodiments of the present disclosure.

FIG. 3 is a flowchart illustrating an example method by which an electronic device provides a notification based on a change in a status of an external device according to various embodiments of the present disclosure.

Hereinafter, the electronic device 102 or at least one external electronic device may be the master electronic device 102-1, the first electronic device 102-3, or the second electronic device 102-5 of FIG. 2. For example, one of the electronic device 102 and at least one external electronic device may be the master electronic device 102-1 and the other one may be the first electronic device 102-3 or the second electronic device 102-5. According to an embodiment, the electronic device 102 and at least one external electronic device may correspond to electronic devices included in one electronic device group.

Referring to FIG. 3, in operation 301, the processor 120 may receive information on the status of at least one external device 105, information related to the location of the electronic device 102, and information related to the location of at least one external electronic device from the server 108 through the communication interface (for example, the communication module 190).

According to an embodiment, the information on the status of the external device 105 may include information on a change in the status (or event occurrence) of the external device 105 (or information indicating the change in the status of the external device 105).

According to an embodiment, the information related to the location of the electronic device 102 may include at least one piece of information on the current location of the electronic device 102, information on a distance between the locations of the electronic device 102 and the external device 105 (or a place in which the external device 105 is disposed), and information indicating that the electronic device 102 is positioned within a predetermined area (for example, within the home 107).

According to an embodiment, the information related to the location of the electronic device 102 may be the same as or similar to information related to the location of the electronic device 102 that the electronic device 102 transmitted to the server 108 in response to a request for the information related to the location of the electronic device 102 from the server 108 before operation 301. However, the present disclosure is not limited thereto.

According to an embodiment, the information on the current location of the electronic device 102 may include Global Positioning System (GPS) coordinates including latitude and longitude. According to an embodiment, when the electronic device 102 receives the information on the current location of the electronic device 102 from the server 108, the processor 120 may acquire the distance between the current location of the electronic device 102 and the external device 105. For example, the processor 120 may acquire information on the location of the external device 105 in response to registration of the external device 105 in the server 108 and store the acquired information on the location of the external device 105 in the memory 130. The processor 120 may acquire (or calculate) the distance between the current location of the electronic device 102 and the external device 105 based on the stored information on the location of the external device 105 and the current location of the electronic device 102 received from the server 108.

According to an embodiment, the information on the distance between the locations of the electronic device 102 and the external device 105 may include a straight distance between the locations of the electronic device 102 and the external device 105 and a distance reflecting a way (or a street) between the locations of the electronic device 102 and the external device 105 (for example, a movement distance from the location of the electronic device 102 to the location of the external device 105 or a distance between the locations of the electronic device 102 and the external device 105 acquired by a route-finding function of a map application).

According to an embodiment, the information indicating that the electronic device 102 is positioned within the predetermined area (for example, within the home 107) may include information indicating that the electronic device 102 is positioned within an area (or a place) in which the external device 105 is positioned. According to an embodiment, the information indicating that the electronic device 102 is positioned within the predetermined area may be information acquired (or calculated) based on the information on the location of the electronic device that the server 108 receives from the electronic device 102 and the information on the location of the external device 105. According to an embodiment, the information indicating that the electronic device 102 is positioned within the predetermined area may be acquired (or calculated) by the processor 120 based on the location of the electronic device 102 from the server 108 and the pre-stored location of the external device 105.

Although FIG. 3 illustrates that the electronic device 102 receives the information related to the location of the electronic device 102 from the server 108, if the electronic device 102 acquires the information related to the location of the electronic device 102 and stores the acquired information related to the location of the electronic device 102, the electronic device 102 may not separately receive the information related to the location of the electronic device from the server 108. However, the present disclosure is not limited thereto.

According to an embodiment, the information related to the location of at least one external electronic device may include at least one piece of information on the current location of at least one external electronic device, information on a distance between the locations of at least one external electronic device and the external device 105 (or a place in which the external device 105 is disposed), and information indicating that at least one external electronic device is positioned within a predetermined area (for example, within the home 107).

According to an embodiment, the information related to the location of at least one external electronic device may be the same as or similar to the information related to the location of at least one external electronic device that at least one external electronic device transmitted to the server 108 in response to a request for the information related to the location of at least one external electronic device from the server 108 before operation 301. However, the present disclosure is not limited thereto.

According to an embodiment, the information on the current location of at least one external electronic device may include GPS coordinates including latitude and longitude. According to an embodiment, when the electronic device 102 receives the information on the current location of at least one electronic device from the server 108, the processor 120 may acquire a distance between the current location of at least one external electronic device and the external device 105.

According to an embodiment, the information indicating that at least one external electronic device is positioned within the predetermined area may include information indicating that at least one external electronic device is positioned within an area (or a place) in which the external device 105 is positioned.

According to an embodiment, although not illustrated in FIG. 3, the processor 120 may further receive, from the server 108, at least one of an age, a gender, a position, or a role of a user of at least one external electronic device, a security level set in the external device 105, attributes of the status of the external device 105, a first policy, and a control right for the external device 105 or may receive the same instead of the information related to the location of the electronic device 102 and the information related to the location of at least one external electronic device in operation 301.

According to an embodiment, when the electronic device 102 stores information on the age, gender, position, or role of the user of at least one external device in the memory 130 before operation 301, the processor 120 may not receive the information on the age, gender, position, or role of the user of at least one external device from the server 108.

According to an embodiment, the security level of the external device 105 may be set in consideration of a risk (or damage) level on the users of the electronic device 102 and at least one external electronic device by the change in the status of the external device 105, invasion of user privacy, and the need to identify the change in the status of the external device 105 urgently by the user. For example, the security level of the external device 105 may be set as shown in [Table 1] below.

TABLE 1

| Security level | Type of external device 105 |
|---|---|
| Security level 1 | Bulb, air conditioner |
| Security level 2 | Television, CCTV, refrigerator |
| Security level 3 | Door lock, window |

According to an embodiment, the highest security level (for example, security level 3) may be set in the door lock and the window having the highest influence of risk or invasion of privacy on the user of the electronic device 102 according to the change in the status of the external device 105. For example, when the door lock or the window is open, goods positioned on the door lock or the window may be lost by another person, and thus the highest security level may be set in the door lock and the window.

According to an embodiment, a device including a camera such as a television or a CCTV may be set have a middle security level (for example, security level 2) because the privacy of the user of the electronic device is invaded by another person when the device is operated (or controlled) by the other person. According to an embodiment, when a refrigerator is open, food and drink in the refrigerator go bad, and thus the refrigerator may be set to have a middle security level (for example, security level 2) in consideration of potential financial expense borne by the user of the electronic device 102.

According to an embodiment, a low security level (for example, security level 1) may be set in the external device 105 having a low influence of risk or invasion of privacy on the user of the electronic device 102 when a device such as a bulb or an air conditioner has a status change.

However, [Table 1] is an example, and a larger or a fewer number of security levels than those shown in [Table 1] may be set, or the security levels may be set in a larger or smaller number of external devices than the external devices 105 shown in [Table 1].

According to an embodiment, the security level of the external device 105 may be set by the master electronic device 102-1 or the server 108. According to an embodiment, the security level of the external device 105 may be set at least partly based on user input. According to an embodiment, the security level of the external device 105 may be automatically set (or without a user input) by the master electronic device e102-1 or the server 108 based on at least one of a type of the external device 105, a category to which the external device 105 belongs, and a type of a device included in the external device 105.

According to an embodiment, when the electronic device 102 stores the external devices 105 and information including the security levels set in the external devices 105 as shown in [Table 1] in the memory 130 before operation 301, the processor 120 may not receive the information on the security level set in the external device 105, of which the status is changed, from the server 108. For example, the electronic device 102 may store the external devices 105 and the information including the security levels set in the external devices 105 in the memory 130 before operation 301. The electronic device may receive unique information of the external device 105 (for example, an Identity (ID) of the external device 105, an International Mobile Equipment Identity (IMEI), or a serial number) together with the information on the status of the external device 108 (or information that can be acquired from the information on the status of the external device 105) from the server 108. The electronic device 102 may identify the security level set in the external device 105, the status of which has been changed, by checking a table in which unique information of the external device 105 is mapped to the security level set in the external device 105.

According to an embodiment, the attributes of the status of the external device 105 (or an event type) may include completion of a function performed in the external device 105 (for example, expiration of a timer set in a predetermined function of a washing machine), an error of a function of the external device 105 (for example, when a refrigerator door is open), and the case in which it is required to control the external device 105 (for example, the case in which a television cannot receive power since a power connection device (for example, a connector) of the television is not connected to a power supply device), as shown in [Table 2] below.

TABLE 2

| Type of attribute | Type of external device 105 |
|---|---|
| Completion of function execution | Washing machine, oven, microwave oven |
| Function error | Washing machine, refrigerator, door lock, CCTV |
| Required to control | Washing machine, refrigerator, television |

However, [Table 2] is an example, and the attributes of the status of the external device 105 may be more various than those shown in [Table 2].

According to an embodiment, the right for the external device 105 may be a right to control the external device 105. According to an embodiment, the right for the external device 105 may include a right to control the external device 105 by the electronic device 102 or a right to output (or receive) information on the status of the external device 105 from the external device 105. For example, the electronic device 102 may receive information indicating that the electronic device 102 can control the external device 105 or information indicating that the electronic device 102 cannot control the external device 105 from the server 108. In another example, the electronic device 102 may receive information indicating that the electronic device can output the status of the external device 105 or information indicating that the electronic device 102 cannot output the status of the external device 105 from the server 108.

In operation 303, the processor 120 may identify (determine) whether to output the status of at least one external device 105 based on at least some of the information related to the location of the electronic device 102 and the information related to the location of at least one external electronic device.

According to an embodiment, the processor 120 may identify whether to output the status of the at least one external device 105 based on at least a configuration for allowing only the electronic device closest to the external device 105 to output the status of the external device 105. For example, the processor 120 may identify that the electronic device 102 is the closer to the external device 105 in comparison with at least one external electronic device. The processor 120 may identify whether to output the status of at least one external device 105 according to a configuration for allowing only the electronic device closest to the external device 105 to output the status of the external device 105. In another example, the processor 120 may identify that the electronic device 102 is farther from the external device 105 in comparison with at least one of the at least one external electronic device. The processor 120 may determine not to output the status of at least one external device 105 according to a configuration for allowing only the electronic device closest to the external device 105 to output the status of the external device 105.

According to an embodiment, the processor 120 may identify whether to output the status of at least one external device 105 based on at least part of the configuration for allowing only the electronic device positioned within a predetermined area (or place) in which the external device 105 is disposed to output the status of the external device 105. For example, when it is identified that the electronic device 102 is positioned within the predetermined area, the processor 120 may determine to output the status of at least one external device 105 according to the configuration for allowing only the electronic device positioned within the predetermined area to output the status of the external device 105. In another example, when it is identified that the electronic device 102 is not positioned within the predetermined area, the processor 120 may determine not to output the status of at least one external device 105 according to the configuration for allowing only the electronic device positioned within the predetermined area to output the status of the external device 105.

According to an embodiment, when neither the electronic device 102 nor the at least one external electronic device is positioned within the predetermined area (or place) (for example, within the home) in which the external device 105 (for example, the door lock) is disposed, the processor 120 may identify whether to output the status of at least one external device 105 based on at least part of the configuration for allowing both the electronic device 102 and at least one external electronic device to output the status of the external device 105. For example, when it is identified that neither the electronic device 102 nor at least the external electronic device is positioned within the predetermined area (or place) in which the external device 105 (for example, the door lock) is disposed, the processor 120 may determine to output the status of at least one external device 105. The location of the electronic device which is not included in the electronic device group within the home at which the door lock of which the status has been changed (for example, the door lock of which the status has been changed from a closed status to an open status) may mean that an outsider other than the users (for example, family members) of the electronic device group invades the home (or is hidden within the home). In this case, information on the status of the door lock may be provided to all users in the electronic device group.

According to an embodiment, the processor 120 may identify whether to output the status of at least one external device 105 based on at least some of the age, gender, position, or role of the users of the electronic device 102 and at least one external electronic device. For example, the processor 120 may identify (or compare) the ages of the users of the electronic device 102 and at least one external electronic device. When it is identified that the user of the electronic device 102 is the oldest according to a configuration for allowing only the electronic device of which the user is the oldest to output the status of the external device 105, the processor 120 may identify whether to output the status of the external device 105. In another example, the processor 120 may identify (or compare) the genders of the users of the electronic device 102 and at least one external electronic device. When it is identified that the user of the electronic device 102 is a female according to a configuration for allowing only the electronic device of male users to output the status of the external device 105, the processor 120 may determine not to output the status of the external device 105. In another example, the processor 120 may identify (or compare) the organizational positions of users of the electronic device 102 and at least one external electronic device. When it is identified that there is a user of an electronic device having a higher position than the user of the electronic device 102 according to a configuration for allowing only the electronic device of the user having the highest position in an office to output the status of the external device 105, the processor 120 may determine not to output the status of the external device 105. In another example, the processor 120 may identify (or compare) the family roles of the users of the electronic device 102 and at least one external electronic device. When it is identified that the user of the electronic device 102 corresponds to a father according to a configuration for allowing only the electronic device of the user who is a father within the home to output the status of the external device 105, the processor 120 may determine to output the status of the external device 105.

According to an embodiment, the processor 120 may identify whether to output the status of at least one external device 105 at least partially based on the security level set in the external device 105. For example, when it is identified that the type of the external device 105 is a door lock having security level 3 (or a door lock in which security level 3 is set), the processor 120 may determine to output the status of the external device 105 according to a configuration for allowing all of the electronic devices 102-1, 102-3, and 102-5 to output the status of the external device 105 corresponding to security level 3. In another example, when it is identified that the type of the external device 105 is an external device 105 having security level 2 or security level 1, the processor 120 may determine not to output the status of the external device 105 according to a configuration for allowing none of the electronic devices 102-1, 102-3, and 102-5 to output the status of the external device 105 having security level 2 or security level 1.

According to an embodiment, the processor 120 may identify whether to output the status of at least one external device 105 based on at least one part of attributes of the status of the external device 105. For example, the processor 120 may identify that the attributes of the status of the external device 105 (for example, a washing machine) correspond to completion of execution of a function (for example, completion of execution of a function of the washing machine). When it is identified that the electronic device 102 is not positioned within a predetermined area according to a configuration for allowing only an electronic device within the predetermined area (for example, within the home) to output the status of the external device 105, the processor 120 may determine not to output the status of the external device 105. However, the present disclosure is not limited thereto.

According to an embodiment, the processor 120 may identify whether to output the status of at least one external device 105 according to whether a right has been assigned to control the external device 105. For example, when it is identified that the electronic device 102 (or the user of the electronic device) has the right to control the external device 105 or receive information on the status of the external device 105, the processor 120 may determine to output the status of the external device 105. In another example, when it is identified that the electronic device 102 (or the user of the electronic device) has no right to control the external device 105 or receive information on the status of the external device 105, the processor 120 may determine not to output the status of the external device 105.

According to an embodiment, the processor 120 may identify whether to output the status of at least one external device 105 at least partially based on whether the electronic device 102 (or the user of the electronic device) is the master electronic device 102-1. For example, the processor 120 may identify that the electronic device 102 is the master electronic device 102-1. The processor 120 may determine to output the status of the external device 105 according to a configuration for allowing only the master electronic device 102-1 to output the status of the external device 105. In another example, the processor 120 may identify that the electronic device 102 is not the master electronic device 102-1. The processor 120 may determine not to output the status of the external device 105 according to the configuration for allowing only the master electronic device 102-1 to output the status of the external device 105.

According to an embodiment, the processor 120 may identify whether to output the status of the external device 105 based on the first policy. According to an embodiment, the processor 120 may identify the first policy for identifying whether to output the status of the external device 105 according to the same configuration (or reference) in all of the electronic device 102 and the at least one external electronic device (or applying the same configuration). For example, the first policy may include information for identifying whether the electronic device 102 and at least one external electronic device equally (or commonly) output the status of the external device 105 based on at least one of information received from the server 108, for example, information related to the location, the age, gender, position, or role of the user, a security level set in the external device 105, attributes of the status of the external device 105, and whether the electronic device is a master electronic device 102-1. For example, the first policy may include information for applying the information related to the location when it is identified whether the electronic device 102 and at least one external electronic device equally (or commonly) output the status of the external device 105. According to an embodiment, the first policy may be generated by the master electronic device 102-1 or the server 108. According to an embodiment, the master electronic device 102-1 or the server 108 may generate the first policy based on at least part of user input or may automatically generate the first policy based on at least one of a type of the external device 105, a category to which the external device 105 belongs, and a device included in the external device 105.

According to an embodiment, the first policy generated by the master electronic device 102-1 may be transmitted to at least one other electronic device 102-3 or 102-5 through the server 108. According to an embodiment, the first policy generated by the server 108 may be transmitted to the electronic device 102 and at least one other external electronic device together with information on the status of the electronic device 102. However, the present disclosure is not limited thereto. For example, in response to registration of the electronic device 102 and at least one external electronic device in the server 108, the electronic device 102 and at least one external electronic device may receive the first policy from the server 108.

According to an embodiment, the processor 120 may identify that the electronic device 102 and at least one external electronic device output information on the status of the external device 105 in a predetermined order based on at least one of information related to the location, the age, gender, position, or family role of the user of each of the electronic devices 102-1, 102-3, or 102-5, whether the electronic device 102 is a master electronic device 102-1, the security level set in the external device 105, and attributes of the status of the external device 105. For example, the processor 120 may identify that the electronic devices 102 sequentially output the status of the external device 105 in sequence from the electronic device closer to the external device 105 based at least partially on information related to the location. However, the present disclosure is not limited thereto, and the processor 120 may identify that the electronic devices 102-1, 102-3, or 102-5 sequentially output the status of the external device 105 in sequence from the electronic device farther from the external device 105 based at least partially on information related to the location.

According to an embodiment, when at least one preceding electronic device outputs the status of the external device 105 or receives input for identifying the output of the status of the external device 105 from the user, the processor 120 may determine not to output the status of the external device 105.

For example, at least one external electronic device having an earlier sequential position may output the status of the external device 105 and then transmit information indicating the output of the status of the external device 105 to the electronic device 102 through the server 108. The processor 120 may identify that at least one external electronic device has output the status of the external device 105 based on at least part of the received information. The processor 120 may determine not to output the status of the external device 105 in response to identification that at least one external electronic device has output the status of the external device 105. In another example, at least one external electronic device having an earlier sequential position may output the status of the external device 105 and then receive input for identifying the output of the status of the external device 105 from the user of the at least one external electronic device. At least one external device 105 may transmit information indicating the reception of the input for identifying the status of the external device 105 to the electronic device 102 through the server 108. The processor 120 may identify that at least one external electronic device has received the input for identifying the status of the external device 105 from the user based on at least part of the received information. The processor 120 may determine not to output the status of the external device 105 in response to the identification that at least one external electronic device has received the input for identifying the status of the external device 105 from the user.

According to an embodiment, when the preceding electronic device did not output the status of the external device 105 or did not receive input for identifying the output status of the external device 105 from the user, the processor 120 may determine to output the status of the external device 105.

For example, when at least one external electronic device having an earlier sequential position is turned off, at least one electronic device may not (or cannot) output the status of the external device 105. When there is no response to the output of the status of the external device 105 from at least one external electronic device for a predetermined time (or there is no response to anything), the server 108 may identify that at least one external electronic device did not output the status of the external device 105. The processor 120 may determine to output the status of the external device 105 in response to reception of information indicating that at least one external electronic device did not output the status of the external device 105 from the server 108. According to an embodiment, the processor 120 may determine to output the status of the external device 105 in response to reception of the information indicating that at least one external electronic device did not output the status of the external device 105 from the server 108 and to identification that the next electronic device to output the status of the external device 105 is the electronic device 102.

In another example, at least one external electronic device having an earlier sequential position may output the status of the external device 105 and then may not (or cannot) receive input for identifying the status of the external device 105 from the user within a predetermined time. The server 108 may receive, from at least one external electronic device, information indicating that at least one external electronic device has not received input from the user for identifying the status of the external device 105 within a predetermined time. The server 108 may transmit, to the electronic device 102, information indicating that at least one external electronic device has not received input for identifying the status of the external device 105 from the user within a predetermined time. The processor 120 may determine to output the status of the external device 105 in response to reception of, from the server 108, the information indicating that at least one external electronic device has not received input for identifying the status of the external device 105 from the user within the predetermined time.

According to an embodiment, when the preceding electronic device did not output the status of the external device 105 or did not receive input for identifying the output status of the external device 105 from the user, the processor 120 may further output information indicating that the preceding electronic device did not output the status of the external device 105 or did not receive input for identifying the output status of the external device 105 from the user.

According to an embodiment, the processor 120 may determine to output the status of the external device 105 based on at least one of the sequence in which to output the status of the external device 105 and the time at which the server 108 transmits information on the status of the external device 105. For example, the electronic device 102 and at least one external electronic device may identify the time (or time point) at which the server 108 transmits information on the status of the external device 105. The electronic device 102 and at least one external electronic device may identify a configuration for sequentially outputting the information on the status of the external device 105 from the time at which the server 108 transmits the information on the status of the external device 105 according to a predetermined sequence in which the server 108 outputs the status of the external device 105. The processor 120 may determine to output the information on the status of the external device 105 in response to identification that a predetermined time has passed since the time at which the server 108 transmits the information on the status of the external device 105.

According to an embodiment, the sequence in which the electronic device 102 and at least one external electronic device output the status of the external device 105 may be identified (or determined) by the master electronic device 102-1. The master electronic device 102-1 may transmit the identified sequence to output the status of the external device 105 to the server 108. According to an embodiment, the sequence in which the electronic device 102 and at least one external electronic device output the status of the external device 105 may be identified (or determined) by each of the electronic device 102 and at least one external electronic device. Each of the electronic device 102 and at least one external electronic device may transmit the identified sequence in which to output the status of the external device 105 to the server 108.

According to an embodiment, the processor 120 may identify the sequence in which the electronic device 102 and at least one external electronic device output the status of the external device 105 based on the first policy. According to an embodiment, the processor 120 may identify a first policy for identifying the sequence in which all of the electronic device 102 and at least one external electronic device output the status of the external device 105 according to the same configuration (or reference) (or by applying the same configuration).

In operation 305, the processor 120 may output the status of at least one external device 105 in response to identification of the output of the status of at least one external device 105.

According to an embodiment, when identifying the output of the status of the external device 105, the processor 120 may identify a scheme for outputting the status of the external device 105.

According to an embodiment, the scheme for outputting the status of the external device 105 may be set based on at least one of a type of the external device 105, a security level set in the external device 105, and attributes of the status of the external device 105. For example, when the external device 105 is a door lock having security level 3 and information on a change in the door lock (for example, a change in the door lock from a closed state to an open state) is received, the processor 120 may simultaneously display the change in the door lock in a pop-up form and output light. In another example, the processor 120 may control a display (for example, the display device 160) to display a changed color of a screen layer (or a changed screen) of the display (for example, the display device 160) in response to the change in the door lock.

In another example, when the external device 105 is a bulb having security level 1 and information on a change in a status of the bulb (for example, a change in the bulb to a turned-on state) is received, the processor 120 may display the change in the bulb through a quick panel. In another example, the processor 120 may store information on the change in the status of the bulb in the memory 130 and may not separately perform a display operation in response to the change in the status of the bulb.

In another example, when the attributes of the status of the external device 105 corresponds to a functional error, the processor 120 may output the status of the external device 105 to enable the user to easily identify the status of the external device 105 compared to completion of execution of the function. For example, when the attributes of the status of the external device 105 correspond to completion of execution of the function, the processor 120 may output only a simple notification. However, when the attributes of the status of the external device 105 indicate a functional error, the processor 120 may display the functional error in a pop-up form and output vibration at the same time.

However, the scheme for outputting the status of the external device 105 is not limited thereto, and the processor 120 may output the status of the external device 105 through, for example, a voice.

According to an embodiment, although not illustrated in FIG. 3, the processor 120 may not output the status of at least one external device 105 in response to identification of non-output of the status of at least one external device 105.

Figure 4:
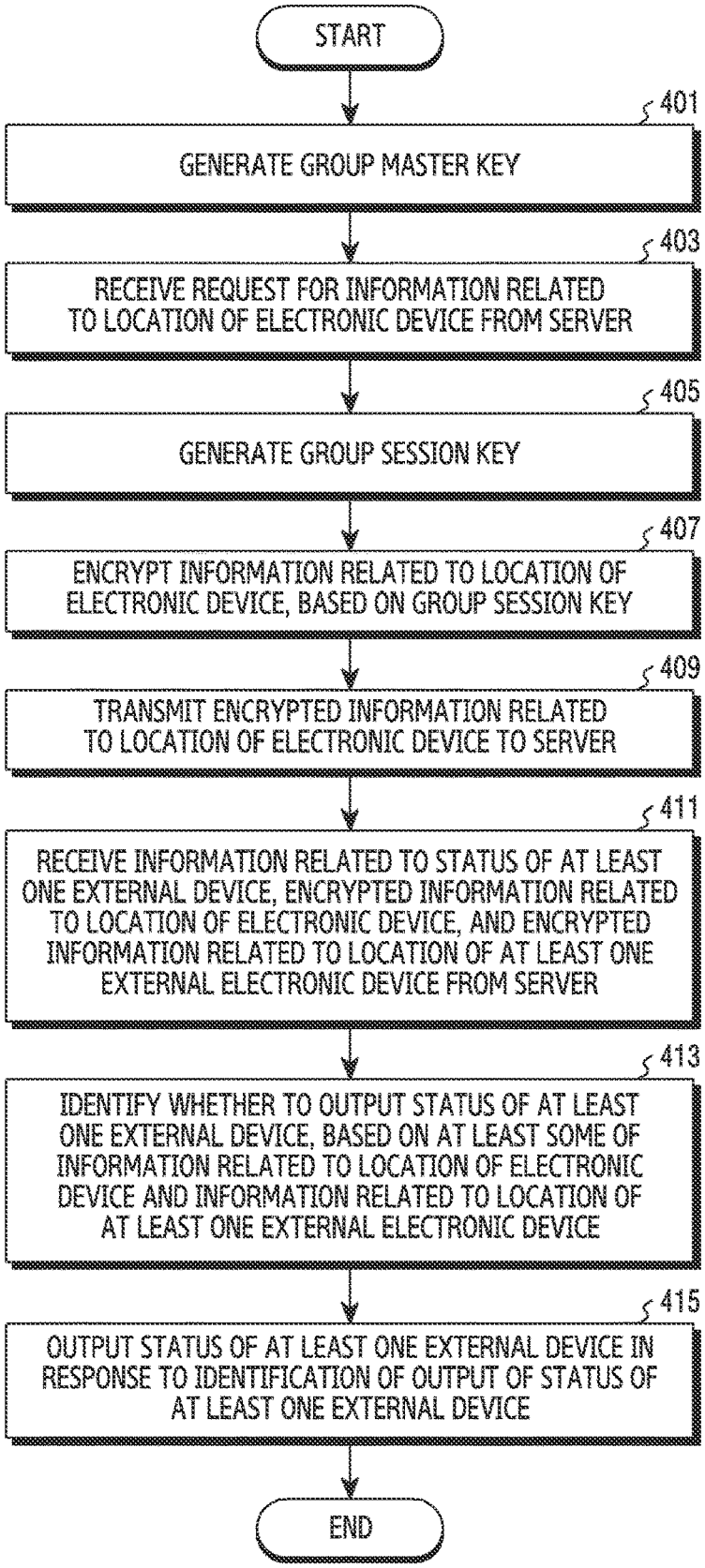
FIG. 4 is a flowchart illustrating an example method of encrypting information related to the location of the electronic device and providing a notification according to various embodiments of the present disclosure.

FIG. 4 is a flowchart illustrating an example method of encrypting information related to the location of the electronic device and providing a notification according to various embodiments of the present disclosure.

The method of FIG. 4 may be related to a method of encrypting information related to the location in order to prevent the location of the user of the electronic device and the location of the user of at least one external electronic device from being leaked to the outside (or another person). However, the information to be encrypted is not limited to the information related to the location.

Hereinafter, the electronic device or at least one external electronic device may be the master electronic device 102-1, the first electronic device 102-3, or the second electronic device 102-5 of FIG. 2. For example, one of the electronic device and at least one external electronic device may be the master electronic device 102-1 and the remaining electronic device may be the first electronic device 102-3 or the second electronic device 102-5. According to an embodiment, the electronic device and at least one external electronic device may correspond to electronic devices included in one electronic device group.

Referring to FIG. 4, in operation 401, the processor 120 may generate a group master secret key.

According to an embodiment, the group master secret key may be a key for generating (or used for generating) a key (for example, a group session key) used for encrypting the locations of the electronic device 102 and at least one external electronic device included in one electronic device group. According to an embodiment, the group master secret key may be shared between the electronic device 102 and at least one external electronic device included in one electronic device group (or may be generated as the same value between the electronic device and at least one external electronic device).

Hereinafter, a method of generating the group master secret key will be described in greater detail with reference to FIGS. 5 and 6.

Figure 5:
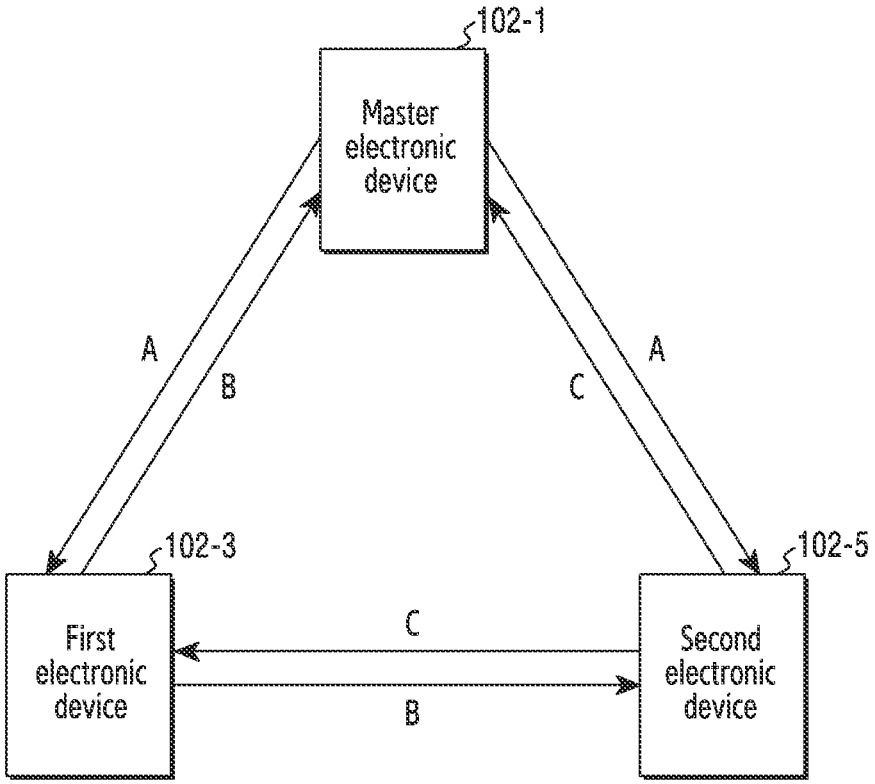
FIG. 5 is a diagram illustrating an example method of generating a group master secret key according to a first embodiment of the present disclosure.

FIG. 5 is a diagram illustrating an example method of generating the group master secret key according to a first embodiment of the present disclosure.

Referring to FIG. 5, the master electronic device 102-1, the first electronic device 102-3, and the second electronic device 102-5 may generate the group master secret key through a group-based cryptography algorithm (hereinafter, referred to as a "first cryptography algorithm"). For example, the master electronic device 102-1, the first electronic device 102-3, and the second electronic device 102-5 may generate the group master secret key through a Group Diffie-Hellman algorithm.

According to an embodiment, each of the master electronic device 102-1, the first electronic device 102-3, and the second electronic device 102-5 may generate a random parameter and transmit the same to (exchange or share the same with) another electronic device. For example, the master electronic device 102-1 may generate A as a random value and transmit the same to the first electronic device 102-3 and the second electronic device 102-5. The first electronic device 102-3 may generate B as a random value and transmit the same to the master electronic device 102-1 and the second electronic device 102-5. The second electronic device 102-5 may generate C as a random value and transmit the same to the master electronic device 102-1 and the first electronic device 102-3. According to an embodiment, A, B, and C generated by the master electronic device 102-1, the first electronic device 102-3, and the second electronic device 102-5 may be different values from each other.

According to an embodiment, the master electronic device 102-1, the first electronic device 102-3, and the second electronic device 102-5 may generate one same group master secret key using (or applying) parameters received from other electronic devices and its own parameter for (or to) a first cryptogram algorithm.

For example, the master electronic device 102-1 may generate D as one group master secret key using A and B or A and C for the first cryptogram algorithm. The first electronic device 102-3 may generate D as one group master secret key using B and A or B and C for the first cryptogram algorithm. The second electronic device 102-5 may generate D as one group master secret key using C and A or C and B for the first cryptogram algorithm. According to an embodiment, the master electronic device 102-1, the first electronic device 102-3, and the second electronic device 102-5 may possess (or store) the same group master secret key (D).

According to an embodiment, the operation in which the master electronic device 102-1, the first electronic device 102-3, and the second electronic device 102-5 generate the group master secret key may be performed at the time point at which the master electronic device 102-1, the first electronic device 102-3, and the second electronic device 102-5 are registered in the server 108 (or the time point at which the registration is completed or the last stage of the registration process). According to an embodiment, the operation in which the master electronic device 102-1, the first electronic device 102-3, and the second electronic device 102-5 generate the group master secret key may be performed (or update) at every time point at which another (new) electronic device is registered in the electronic device group. According to an embodiment, the operation in which the master electronic device 102-1, the first electronic device 102-3, and the second electronic device 102-5 generate the group master secret key may be performed at every time point at which another (or new) external device 105 is registered in an external device 105 group.

According to an embodiment, the master electronic device 102-1, the first electronic device 102-3, and the second electronic device 102-5 may store the generated group master secret key in the memory (for example, the memory 130).

According to an embodiment, the operation in which the master electronic device 102-1, the first electronic device 102-3, and the second electronic device 102-5 generate the group master secret key may be performed before the master electronic device 102-1, the first electronic device 102-3, and the second electronic device 102-5 receive information related to the location from the server 108.

Figure 6:
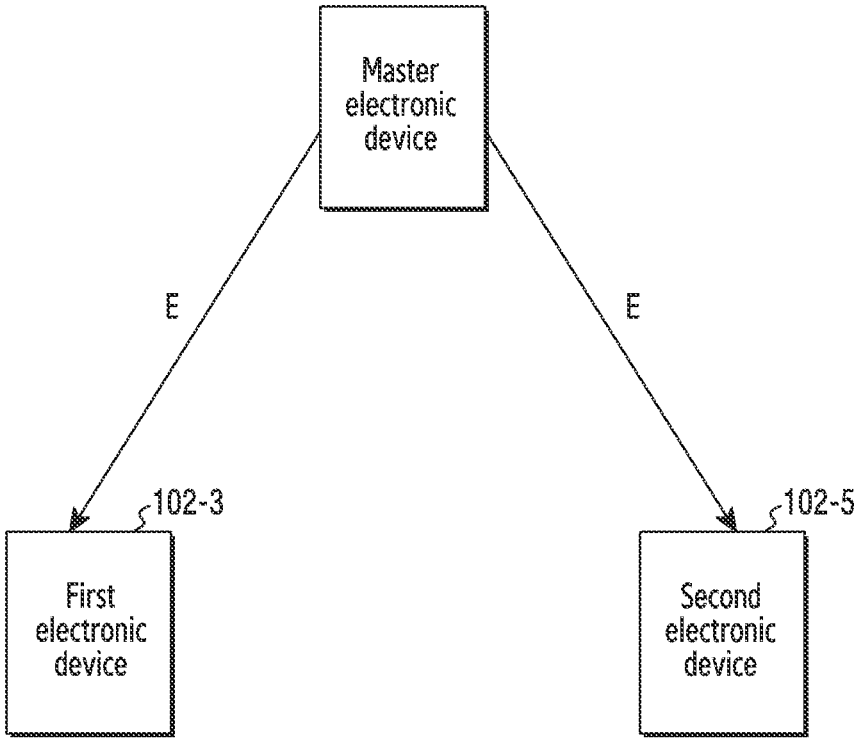
FIG. 6 is a diagram illustrating an example method of generating a group master secret key according to a second embodiment of the present disclosure.

FIG. 6 is a diagram illustrating an example method of generating a group master secret key according to a second embodiment of the present disclosure.

Referring to FIG. 6, the master electronic device 102-1 may generate a group master secret key and transmit the generated group master secret key to the first electronic device 102-3 and the second electronic device 102-5.

For example, the master electronic device 102-1 may generate a parameter (E) as a random value. The master electronic device 102-1 may transmit the parameter (E) to the first electronic device 102-3 and the second electronic device 102-5. According to an embodiment, the first electronic device 102-3 and the second electronic device 102-5 may store the parameter (E) received from the master electronic device 102-1 in the memory (for example, the memory 130) as the group master secret key.

According to an embodiment, the master electronic device 102-1 may transmit the group master secret key to the first electronic device 102-3 and the second electronic device 102-5 through a safe channel. For example, the master electronic device 102-1 may transmit the group master secret key to the first electronic device 102-3 and the second electronic device 102-5 through a Secure Sockets Layer (SSL), Transport Layer Security (TLS), or a hypertext transfer protocol over secure socket layer (https).

According to an embodiment, as the master electronic device 102-1 generates the group master secret key and transmits the generated group master secret key to the first electronic device 102-3 and the second electronic device 102-5, the master electronic device 102-1, the first electronic device 102-3, and the second electronic device 102-5 may share (store, possess, or generate) the same group master secret key (E).

According to an embodiment, the operation in which the master electronic device 102-1, the first electronic device 102-3, and the second electronic device 102-5 share the group master secret key may be performed at the time point at which the master electronic device 102-1, the first electronic device 102-3, and the second electronic device 102-5 are registered in the server 108 (the time point at which the registration is completed or the last stage of the registration process). According to an embodiment, the operation in which the master electronic device 102-1, the first electronic device 102-3, and the second electronic device 102-5 generate the group master secret key may be performed (or update) at every time point at which another (new) electronic device is registered in the electronic device group. According to an embodiment, the operation in which the master electronic device 102-1, the first electronic device 102-3, and the second electronic device 102-5 share the group master secret key may be performed at every time point at which another (or new) external device 105 is registered in the external device 105 group.

According to an embodiment, the master electronic device 102-1, the first electronic device 102-3, and the second electronic device 102-5 may store the shared group master secret key in the memory (for example, the memory 130).

According to an embodiment, the operation in which the master electronic device 102-1, the first electronic device 102-3, and the second electronic device 102-5 share the group master secret key may be performed before the master electronic device 102-1, the first electronic device 102-3, and the second electronic device 102-5 receive information related to the location from the server 108.

Referring back to FIG. 4, in operation 403, the processor 120 may receive a request for information related to the location of the electronic device 102 from the server 108. For example, the server 108 may make a request for information related to the location of the electronic device 102 and information related to the location of at least one external electronic device to the electronic device 102 and at least one external electronic device.

According to an embodiment, the processor 120 may receive a request for consent (or a user's consent) to collection of information related to the location of the electronic device from the server 108. According to an embodiment, the processor 120 may receive information on at least one of an application to use information related to the location of the electronic device 102, a reason why the information related to the location of the electronic device 102 is needed, and a device to use the information related to the location of the electronic device 102 as well as consent to collection of the information related to the location of the electronic device 102 from the server 108. According to an embodiment, the processor 120 may transmit information indicating the consent to collection of the information related to the location of the electronic device 102 to the server 108 in response to reception of, from the user, input for accepting the request for the consent to collection of the information related to the location of the electronic device from the server 108.

According to an embodiment, the operation in which the processor 120 receives the request for consent to the collection of the information related to the location of the electronic device 102 from the server may be performed whenever the processor 120 receives a request for information related to the location of the electronic device 102 from the server 108.

According to an embodiment, the processor 120 may receive the request for the consent to collection of the information related to the location of the electronic device 102 from the server 108 at the time point at which an application for controlling the external device 105 is installed. The processor 120 may receive the input for consenting to (or accepting) the request of the server 108 from the user and transmit information indicating the received input (or information indicating that the input for the consent is received from the user) to the server 108. According to an embodiment, when the processor 120 transmits the input for consenting to the request of the server 108 received from the user to the server 108 and then receives a request for information related to the location of the electronic device 102 from the server 108, the processor 120 may transmit information related to the location of the electronic device 102 to the server 108 without receiving the input for consenting to the request for information related to the location of the electronic device 102 from the user of the electronic device 102 again. For example, when the processor 120 transmits the input for consenting to the request of the server 108 received from the user to the server 108 and then receives the request for information related to the location of the electronic device 102 from the server 108, the processor 120 may transmit information related to the location of the electronic device 102 to the server 108 without displaying the received request for the location information (in the background). According to an embodiment, the processor 120 may store the request for information related to the location of the electronic device 102 from the server 108 or a history related to transmission of the information related to the location of the electronic device 102 to the server 108 in the memory 130.

According to an embodiment, the processor 120 may not receive, from the user of the electronic device, the input for accepting the request for consenting to collection of information related to the location of the electronic device 102 from the server 108. According to an embodiment, when the processor 120 does not receive, from the user of the electronic device 102, the input for allowing the request for consenting to collection of the information related to the location of the electronic device 102 from the server 108, the processor 120 may identify whether the electronic devices 102-1, 102-3, and 102-5 output the status (or a change in the status) of the external device 105 based on at least one of, for example, the age, gender, position, or role of the users of the electronic device 102 and at least one external electronic device, whether the electronic device 102 is the master electronic device 102-1, a security level set in the external device 105, and attributes of the status of the external device 105 except for the information related to the location of the electronic device 102 described below in operation 413. However, the present disclosure is not limited thereto.

In operation 405, the processor 120 may generate a group session key.

According to an embodiment, the processor 120 may generate a group session key (or a symmetric key) based on at least some of information included in the request for the information related to the location of the electronic device 102 received from the server 108 and a group master secret key. For example, the processor 120 may identify the time (a time stamp for the time at which the server 108 transmits the request) at which the server 108 transmits the request for information related to the location, which is included in the request for the information related to the location of the electronic device 102 received from the server 108. The processor 120 may generate a group session key by hashing the time at which the server 108 transmits the request and the group master secret key stored in the memory 130 (or by outputting a hash value (or a hash code) through a hash function). According to an embodiment, the group session key may be generated as the same value by the electronic device 102 and at least one electronic device. For example, the electronic device 102 and at least one external electronic device may identify the time at which the server 108 transmits the request for information related to the location as the same time (or the same time value) by making a request for information related to the location to the electronic device 102 and at least one external electronic device at the same time (or simultaneously). The electronic device 102 and at least one electronic device may generate the same group master secret key through the scheme described in FIG. 5 or 6 and store the generated group master secret key in the memory 130. The electronic device 102 and at least one electronic device may generate the same group session key by hashing the same group master secret key and the same time value at which the server transmits the request for information related to the location. According to an embodiment, the processor 120 may update the group session key according to a predetermined cycle. According to an embodiment, the processor 120 may update the group session key whenever receiving the request for information related to the location of the electronic device 102 from the server 108.

In operation 407, the processor 120 may encrypt the information related to the location of the electronic device 102 based on the generated group session key. For example, the processor 120 may encrypt the information related to the location of the electronic device 102 through the group session key.

In operation 409, the processor 120 may transmit the encrypted information related to the location of the electronic device 102 to the server 108.

According to an embodiment, although it is illustrated that the request for information related to the location of the electronic device 102 is received from the server 108 and the electronic device 102 transmits the information related to the location of the electronic device 102 to the server 108 in operations 403 to 409, the present disclosure is not limited thereto. For example, the electronic device 102 may receive a request for information on at least one of the age, gender, position, or role of the user of the electronic device 102 and whether the electronic device 102 is the master electronic device 102-1 as well as the information related to the location of the electronic device 108 from the server 108 or instead of the information related to the location of the electronic device 102, encrypt the requested information, and then transmit the information to the server 108.

According to an embodiment, the operation in which the request for the information related to the location of the electronic device 102 is received from the server 108 and the operation in which the electronic device transmits the information related to the location of the electronic device 102 to the server 108 may be performed through a safe channel (for example, SSL, TLS, or https).

In operation 411, the processor 120 may receive the information on the status of at least one external device 105, the encrypted information related to the location of the electronic device 102, and the encrypted information related to the location of at least one external electronic device from the server 108 through a communication interface (for example, the communication module 190.).

According to an embodiment, the processor 120 may decrypt (or decode) the encrypted information related to the location of the electronic device 102 and the encrypted information related to the location of at least one external electronic device.

For example, the processor 120 may decrypt the encrypted information related to the location of the electronic device 102 and the encrypted information related to the location of at least one external electronic device through the group session key.

Although not illustrated in FIG. 4, not only the electronic device 102 but also at least one external electronic device may decrypt the encrypted information related to the location of the electronic device 102 and the encrypted information related to the location of at least one external electronic device through the group session key which is the same as the group session key stored by the electronic device 102.

According to an embodiment, when receiving information on at least one of the age, gender, position, or role of the user of the electronic device 102 and whether the electronic device 102 is the master electronic device 102-1 as well as the encrypted information related to the location received from the server 108 as the encrypted information, the processor 120 may decrypt the encrypted information on at least one of the age, gender, position, or role of the user of the electronic device 102 and whether the electronic device is the master electronic device 102-1 through the group session key.

According to an embodiment, since operation 411 is at least partially the same as or similar to operation 301, redundant descriptions will not be repeated.

In operation 413, the processor 120 may identify whether to output the status of at least one external device 105 based on at least some of the information related to the location of the electronic device 102 and the information related to the location of at least one external electronic device.

In operation 415, the processor 120 may output the status of at least one external device 105 in response to identification of the output of the status of at least one external device 105.

Since operations 413 and 415 of FIG. 4 are at least partially the same as or similar to operations 303 and 305 of FIG. 3, a detailed description thereof will not be repeated.

As illustrated in FIG. 4, the electronic device 102 may encrypt information related to the location and transmit the encrypted location to the server 108 in operation 409, and the server 108 may transmit the encrypted information related to the location of the electronic device 102 and the encrypted information related to the location of at least one external electronic device to the electronic device 102 in operation 411. The server 108 which cannot generate the group session key (or another electronic device which is not included in the electronic device group) cannot decrypt the encrypted information related to the location of the electronic device 102 (or information related to the location of at least one external electronic device). Accordingly, security of the information related to the location of the electronic device 102 (or information related to the location of at least one external electronic device) may be maintained (or information related to the location of the electronic device 102 may be protected).

Figure 7:
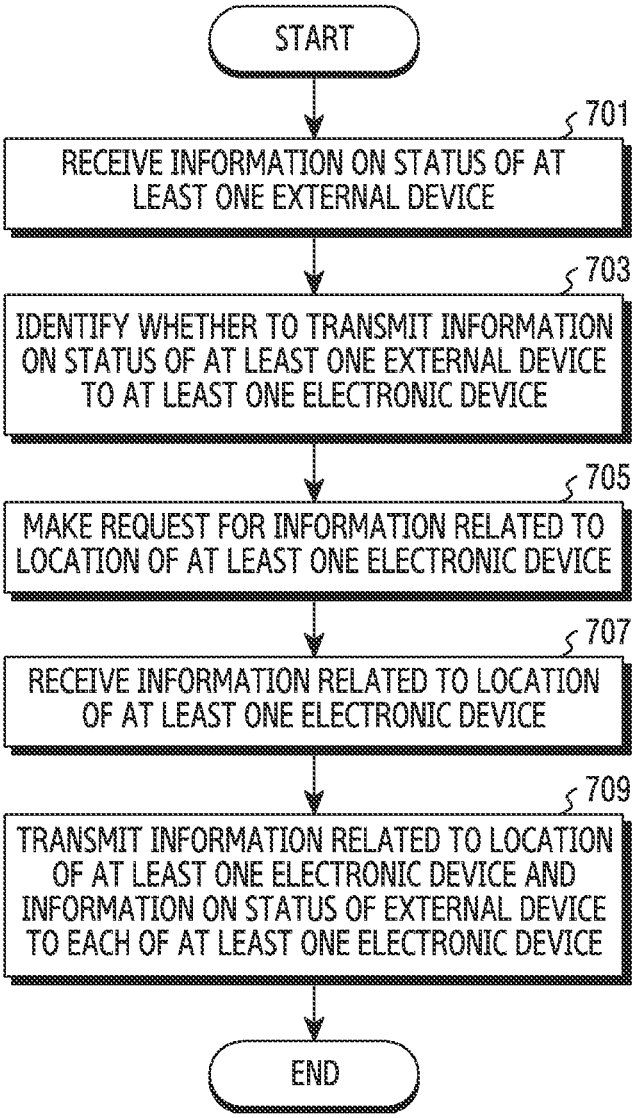
FIG. 7 is a flowchart illustrating example operation of a server for providing a notification in the electronic device according to various embodiments of the present disclosure.

FIG. 7 is a flowchart illustrating an example operation of the server for providing a notification in the electronic device according to various embodiments of the present disclosure.

FIG. 7 may correspond to an operation of the server 108 performed in connection with the method by which the server 108 provides the notification.

Referring to FIG. 7, in operation 701, the server 108 may receive information on the status of the external device 105 from the external device 105.

In operation 703, the server 108 may identify whether to transmit the information on the status of at least one external device 105 to at least one electronic device.

According to an embodiment, when it is identified that a change in the status of the external device 105 corresponds to a predetermined pattern, the server 108 may determine not to transmit information on the status of at least one external device 105 to the electronic devices 102-1, 102-3, and 102-5. For example, the server 108 may identify a history of the change in the status of the external device 105, and when it is identified that the currently made change in the status of the external device 105 corresponds to a regularly made change in the status of the external device 105 (for example, when it is identified that the change is made at the same time every day (or every week)), the server 108 may determine not to transmit the information on the status of at least one external device 105 to at least one electronic device.

According to an embodiment, when the server 108 identifies that the status of the external device 105 is changed by a user's configuration (for example, If This, Then That (IFTTT) or reservation for performing the function of the external device 105) related to at least one external device 105, the server 108 may determine not to transmit information on the status of the external device 105 to at least one electronic device. The case in which the change in the status of at least one external device 105 corresponds to a predetermined pattern or is made by the user's configuration related to the external device 105 is the case in which the user of at least one electronic device can predict a change in the status of the external device 105 or the case in which it is less likely to cause unpredicted damage (or risk) due to the change in the status of the external device 105, so that it is not required to provide information on the chance in the status of at least one external device 105 to the user of at least one electronic device. However, the operation in which the server 108 identifies whether to transmit information on the status of at least one external device 105 to at least one electronic device may be omitted according to an embodiment. According to an embodiment, the server 108 may determine to transmit the information on the status of at least one external device 105 only to the master electronic device 102-1.

In operation 705, the server 108 may make a request for information related to the location of at least one electronic device to at least one electronic device in response to reception of the information on the change in the status of at least one external device 105. However, the present disclosure is not limited thereto, and the server 108 may make a request for information on at least one of the age, gender, position, or family role of the user of the electronic device and whether the electronic device is the master electronic device 102-1 as well as information related to the location of at least one electronic device or instead of the information related to the location of at least one electronic device.

In operation 707, the server 108 may receive the information related to the location of at least one electronic device (or encrypted information related to the location of at least one electronic device) from at least one electronic device.

In operation 709, the server 108 may transmit the information related to the location of at least one electronic device together with the information on the status of the external device 105 to each of at least one electronic device.

According to an embodiment, the server 108 may transmit at least one of the age, gender, position, or family role of the user of at least one electronic device, a security level set in the external device 105, attributes of the status of the external device 105, a first policy, or a control right for the external device 105 as well as the information related to the location of at least one electronic device or instead of the information related to the location of at least one electronic device.

Figure 8:
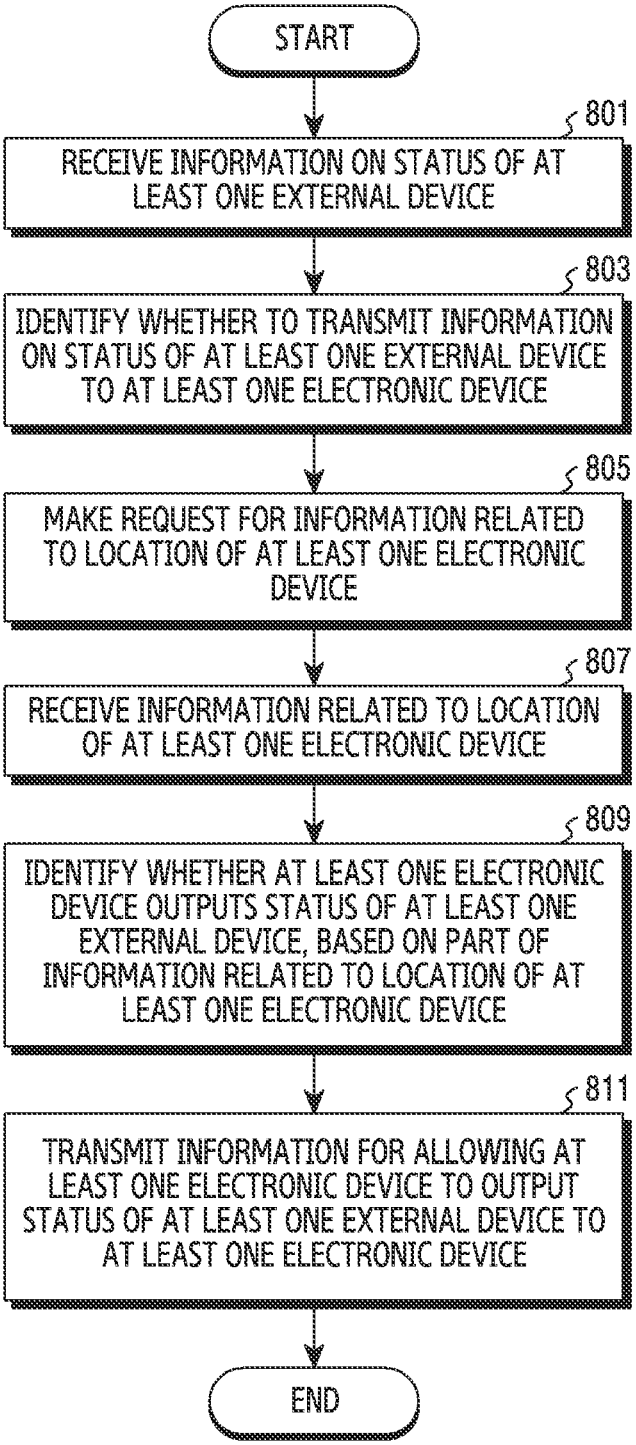
FIG. 8 is a flowchart illustrating another example operation of the server for providing a notification in the electronic device according to various embodiments of the present disclosure.

FIG. 8 is a flowchart illustrating another example operation of the server for providing a notification in the electronic device according to various embodiments of the present disclosure.

FIG. 8 may correspond to the operation performed in connection with the method by which the server 108 provides the notification.

Referring to FIG. 8, since operations 801 to 807 are at least partially the same as or similar to operations 701 to 707 of FIG. 7, a detailed description thereof will not be repeated.

In operation 809, the server 108 may identify whether at least one electronic device outputs the status of at least one external device 105 based at least partially on information related to the location of at least one electronic device.

According to an embodiment, the server 108 may identify (or determine) whether at least one electronic device outputs the status of at least one external device 105 based at least partially on information related to the location of at least one electronic device without transmitting information related to the location of at least one electronic device to at least one electronic device.

According to an embodiment, in operation 809, the server 108 may perform an operation which is the same as or similar to that performed by the electronic device 102 in operation 303 of FIG. 3. For example, the server 108 may identify whether the electronic devices 102-1, 102-3, and 102-5 output the status (or a change in the status) of the external device 105 based on at least one of the information related to the location of the electronic devices 102-1, 102-3, and 102-5, the age, gender, position, or role of the users of the electronic devices 102-1, 102-3, and 102-5, whether the electronic device is the master electronic device 102-1, the security level set in the external device 105, and attributes of the status of the external device 105. In another example, the server 108 may designate (or determine) a scheme in which at least one external electronic device outputs the status of the external device 105. In another example, the server 108 may designate the sequence in which at least one external electronic device outputs the status of at least one external device 105.

In operation 811, the server 108 may transmit, to at least one electronic device, information (or a command) for allowing at least one electronic device to output the status of at least one external device 105. For example, at least one electronic device may or may not output the status of at least one external device 105 according to the information for allowing at least one electronic device to output the status of at least one external device 105 received from the server 108.

Figure 9:
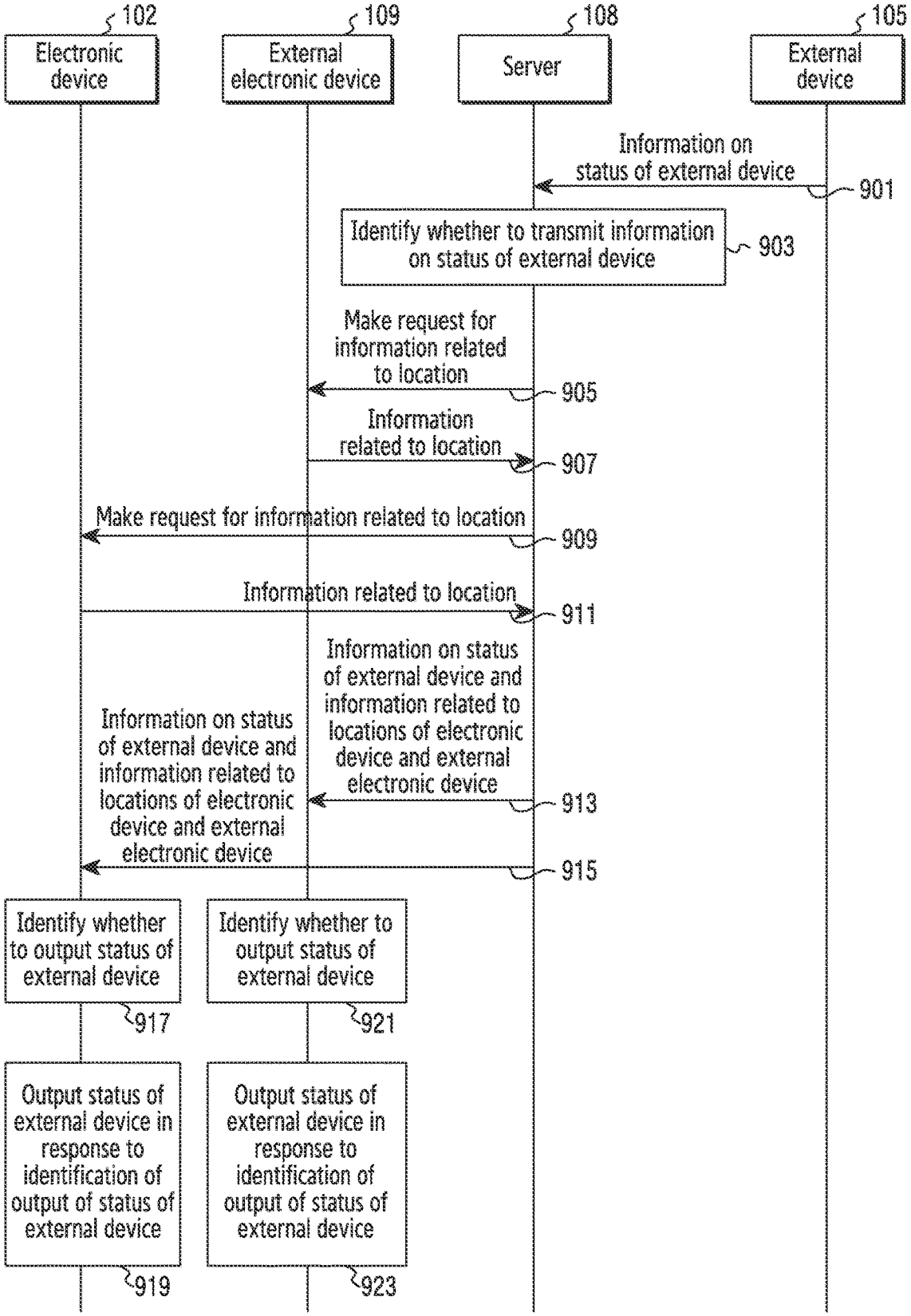
FIG. 9 is a flowchart illustrating a system for providing a notification in the electronic device according to a change in the status of the external device according to various embodiments of the present disclosure.

FIG. 9 is a flowchart illustrating an example operation of a system for providing a notification to an electronic device according to a change in the status of the external device according to various embodiments of the present disclosure.

Referring to FIG. 9, the electronic device 102 or an external electronic device 109 may be the master electronic device 102-1, the first electronic device 102-3, or the second electronic device 102-5 of FIG. 2. For example, one of the electronic device 102 and the external electronic device 109 may be the master electronic device 102-1 and the other one may be the first electronic device 102-3 or the second electronic device 102-5. According to an embodiment, the electronic device 102 and the external electronic device 109 may correspond to electronic devices included in one electronic device group.

In operation 901, the server 108 may receive information on the status of the external device 105 from the external device 105.

In operation 903, the server 108 may identify whether to transmit information on the status of the external device 105 to the electronic device 102 and the external electronic device 109.

According to an embodiment, when it is identified that the change in the status of the external device 105 corresponds to a predetermined pattern, the server 108 may determine not to transmit information on the status of the external device 105 to the electronic device 102 and the external electronic device 109.

According to an embodiment, when the server 108 identifies that the status of the external device 105 is changed by a user's (intended) configuration (for example, If This, Then That (IFTTT) or reservation for performing the function of the external device 105), the server 108 may determine not to transmit information on the status of the external device 105 to the electronic device 102 and the external electronic device 109.

According to an embodiment, the server 108 may determine to transmit information on the status of the external device 105 only to the electronic device corresponding to the master electronic device among the electronic device 102 and the external electronic device 109.

However, the operation in which the server 108 identifies whether to transmit the information on the status of at least one external device 105 to at least one electronic device in operation 903 may be omitted according to an embodiment.

In operation 905, the server 108 may make a request for information related to the location of the external electronic device 109 to the external electronic device 109 in response to reception of the information on the change in the status of the external device 105. However, the present disclosure is not limited thereto, and the server 108 may make a request for information on at least one of the age, gender, position, or role of the user of the external electronic device 109 and whether the external electronic device 109 is the master electronic device 102-1 as well as the information related to the location of the external electronic device 109 or instead of the information related to the location of the external electronic device 109.

In operation 907, the external electronic device 109 may transmit information related to the location of the external electronic device 109 (or encrypted information related to the location of the external electronic device 109) to the server 108. Although not illustrated in FIG. 9, after encrypting the information related to the location of the external electronic device 109 through a group session key, the external electronic device 109 may transmit the encrypted information related to the location of the external electronic device 109 to the server 108.

In operation 909, the server 108 may make a request for information related to the location of the electronic device 102 to the electronic device 102 in response to reception of the information on the change in the status of the external device 105.

In operation 911, the electronic device 102 may transmit information related to the location of the electronic device 102 (or encrypted information related to the location of the electronic device 102) to the server 108. Although not illustrated in FIG. 9, after encrypting the information related to the location of the electronic device 102 through the group session key, the electronic device 102 may transmit the encrypted information related to the location of the electronic device 102 to the server 108.

Although FIG. 9 illustrates that operations 905 and 907 are performed earlier than operations 909 and 911, at least one of operations 909 and 911 may be performed earlier than at least one of operations 905 and 907.

In operation 913, the server 108 may transmit information on the status of the external device 105, information related to the location of the electronic device (or encrypted information related to the location of the electronic device 102), and information related to the location of the external electronic device 109 (or encrypted information related to the location of the external electronic device 109) to the external electronic device 109.

In operation 915, the server 108 may transmit information on the status of the external device 105, information related to the location of the electronic device 102 (or encrypted information related to the location of the electronic device 102), and information related to the location of the external electronic device 109 (or encrypted information related to the location of the external electronic device 109) to the electronic device 102.

Although not illustrated in operations 913 and 915, the server 108 may further transmit at least one of the age, gender, position, or role of the users of the electronic device 102 and the external electronic device 109, the security level set in the external device 105, attributes of the status of the external device 105, the first policy, and the control right for the external device 105 or may transmit the same instead of the information related to the location of the electronic device 102 and the information related to the location of the external electronic device 109 in operations 913 and 915.

Although FIG. 9 illustrates that operation 913 is performed earlier than operation 915, operation 915 may be performed earlier than operation 913.

In operation 917, the electronic device 102 may identify whether to output the status of the external device 105 based at least partially on information related to the location of the electronic device 102 and the location of the external electronic device 109.

According to an embodiment, the electronic device 102 may identify whether to output the status of the external device 105 based on at least part of a configuration for allowing only the electronic device closest to the external device 105 to output the status of the external device 105.

According to an embodiment, the electronic device 102 may identify whether to output the status of the external device 105 based on at least part of a configuration for allowing only the electronic device positioned within a predetermined area (or place) in which the external device 105 is disposed to output the status of the external device 105.

According to an embodiment, when none of the electronic device 102 and the external electronic device 109 are positioned within a predetermined area (or within the home) in which the external device 105 (for example, a door lock) is disposed, the electronic device 102 may identify whether to output the status of the external device 105 based on at least part of a configuration for allowing both the electronic device 102 and the external electronic device 109 to output the status of the external device 105.

According to an embodiment, the electronic device 102 may identify whether to output the status of the external device 105 based on at least some of the age, gender, position, or role of the users of the electronic device 102 and the external electronic device 109.

According to an embodiment, the electronic device 102 may identify whether to output the external device 105 at least partially based on the security level set in the external device 105.

According to an embodiment, the electronic device 102 may identify whether to output the status of the external device 105 based on at least some of the attributes of the status of the external device 105.

According to an embodiment, the processor 120 may identify whether to output the status of the external device 105 according to whether a control right has been assigned for the external device 105.

According to an embodiment, the electronic device 102 may identify whether to output the status of the external device 105 based at least partly on information on whether the electronic device 102 is the master electronic device 102-1.

According to an embodiment, the electronic device 102 may identify whether to output the status of the external device 105 based on the first policy.

According to an embodiment, the electronic device 102 may identify that the electronic device 102 and the external electronic device 109 output the information on the status of the external device 105 according to the order determined based on at least one of the information related to the locations of the electronic device 102 and the external electronic device 109, the age, gender, position, or role of the user of each of the electronic device 102 and the external electronic device 109, whether the electronic device 102 is the master electronic device 102-1, the security level set in the external device 105, and attributes of the status of the external device 105.

According to an embodiment, when the preceding external electronic device 109 (or having the previous turn in the predetermined sequence) outputs the status of the external device 105 or receives an input for identifying the status of the external device 105 output from the user, the electronic device 102 may determine not to output the status of the external device 105.

According to an embodiment, when the preceding external electronic device 109 does not output the status of the external device 105 and does not receive input for identifying the output status of the external device 105 from the user, the electronic device 102 may determine to output the status of the external device 105.

According to an embodiment, when the preceding external electronic device 109 does not output the status of the external device 105 or does not receive input for identifying the output status of the external device 105 from the user, the electronic device 102 may further output information indicating that the preceding electronic device did not output the status of the external device 105 or did not receive input for identifying the output status of the external device 105 from the user.

According to an embodiment, the electronic device 102 may determine to output the status of the external device 105 at least partially based on the sequence of output of the status of the external device 105 and the time at which the server 108 transmits the information on the status of the external device 105.

According to an embodiment, the sequence in which the electronic device 102 and the external electronic device 109 output the status of the external device 105 may be identified (or determined) by the electronic device corresponding to the master electronic device 102-1 among the electronic device 102 and the external electronic device 109.

According to an embodiment, the electronic device 102 may identify the sequence in which the electronic device 102 and the external electronic device 109 output the status of the external device 105 based on the first policy.

In operation 919, the electronic device 102 may output the status of the external device 105 in response to identification of the output of the status of the external device 105.

According to an embodiment, when it is identified that the status of the external device 105 is to be output, the electronic device 102 may identify a scheme for outputting the status of the external device 105.

According to an embodiment, the scheme for outputting the status of the external device 105 may be set based on at least one of a type of the external device 105, the security level set in the external device 105, and the attributes of the status of the external device 105.

According to an embodiment, although not illustrated in FIG. 9, the electronic device 102 may not output the status of the external device 105 in response to identification of non-output of the status of the external device 105.

In operation 921, the external electronic device 109 may identify whether to output the status of the external device 105 based on at least some of the information related to the location of the electronic device 102 and the information related to the location of the external electronic device 109.

In operation 923, the external electronic device 109 may output the status of the external device 105 in response to identification of output of the status of the external device 105.

Since operations 921 and 923 performed by the external electronic device 109 are at least partially the same as or similar to operations 917 and 919 performed by the electronic device 102, a detailed description thereof will not be repeated.

Although FIG. 9 illustrates that operations 917 and 919 are performed earlier than operations 921 and 923, at least one of operations 921 and 923 may be performed earlier than at least one of operations 917 and 919.

Figure 10:
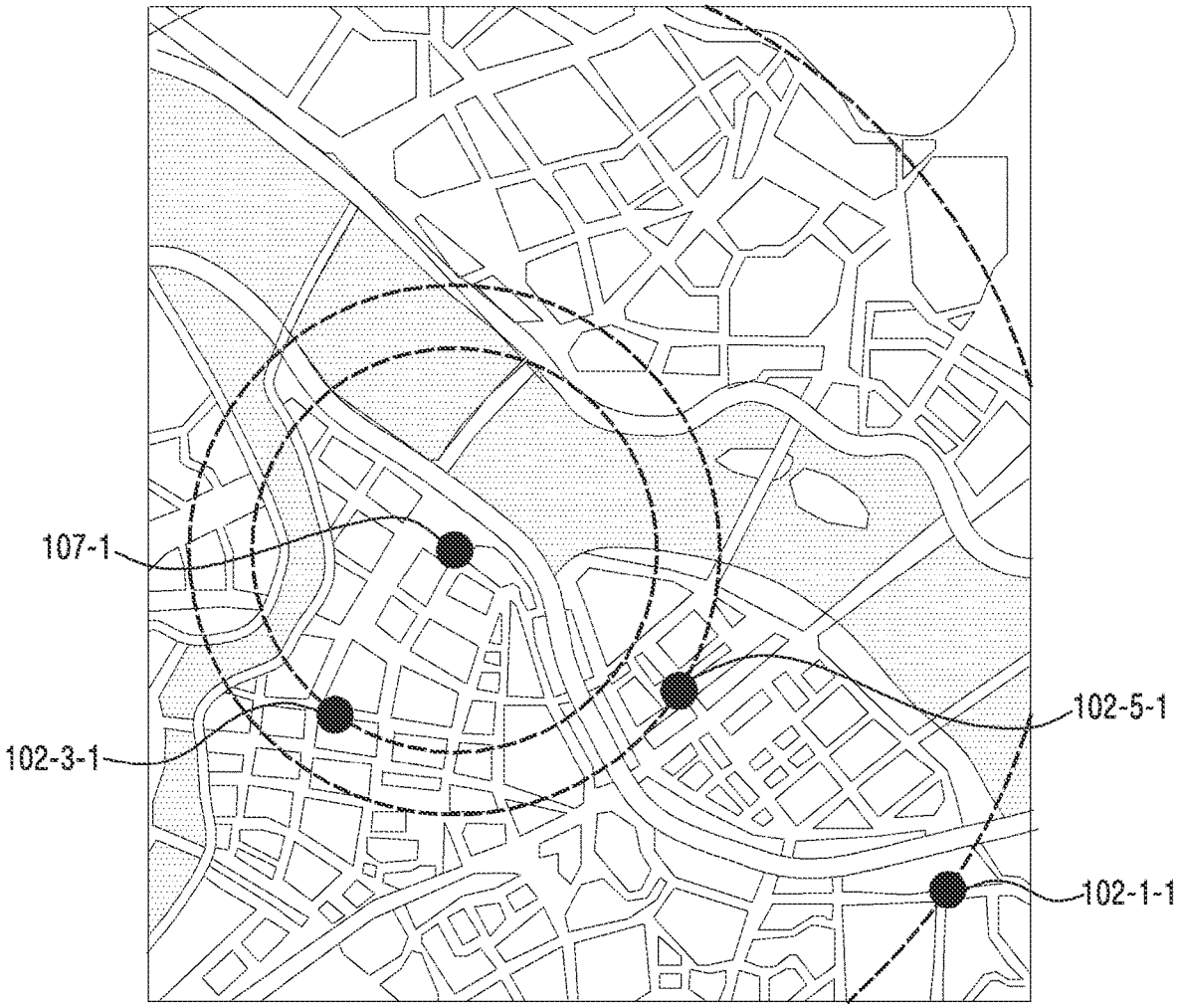
FIG. 10 is a diagram illustrating an example of information related to the location of the electronic device according to various embodiments of the present disclosure.

FIG. 10 is a diagram illustrating an example for describing information related to the location of the electronic device according to various embodiments of the present disclosure.

Referring to FIG. 10, according to an embodiment, information on the current locations of the electronic devices 102-1, 102-3, and 102-5 may include Global Positioning System (GPS) coordinates including latitude and longitude.

For example, the information on the current locations of the electronic devices 102-1, 102-3, and 102-5 and the location in which the external device 105 is disposed may be as shown in [Table 3].

TABLE 3

| | GPS coordinates |
|---|---|
| Location 107-1 at which external device is disposed | Latitude: 37.270726, Longitude: 127.045069 |
| Master electronic device 102-1-1 | Latitude: 37.266059, Longitude: 127.057844 |
| First electronic device 102-3-1 | Latitude: 37.267122, Longitude: 127.041533 |
| Second electronic device 102-5-1 | Latitude: 37.268831, Longitude: 127.051042 |

According to an embodiment, when the electronic devices 102-1, 102-3, and 102-5 receive information on the current locations of the electronic devices 102-1, 102-3, and 102-5 from the server 108, the electronic devices 102-1, 102-3, and 102-5 may acquire a distance between the current locations of the electronic devices 102-1, 102-3, and 102-5 and the external device 105. For example, as shown in [Table 4] below, the electronic devices 102-1, 102-3, and 102-5 may acquire (or calculate) a straight distance between the current locations of the electronic devices 102-1, 102-3, and 102-5 and the external device 105 based on the stored information on the location of the external device 105 and the current locations of other electronic devices received from the server 108.

TABLE 4

| | Straight distance from external electronic device |
|---|---|
| Master electronic device | 1.24 km (kilometer) |
| First electronic device | 1.04 km |
| Second electronic device | 1.64 km |

However, the present disclosure is not limited thereto, and the electronic devices 102-1, 102-3, and 102-5 may acquire a distance reflecting a route (or a street) between the locations of the electronic devices 102-1, 102-3, and 102-5 and the location of the external device 105 (for example, a movement distance from the location of the electronic device to the location of the external device 105 or a distance between the location of the external device 105 and the location of the electronic device acquired through a way-finding function of a map application).

According to an embodiment, the electronic devices 102-1, 102-3, and 102-5 may acquire information indicating that at least one electronic device is positioned within an area (or place) in which the external device 105 is positioned. According to an embodiment, the information indicating that at least one electronic device is positioned within the predetermined area may be information that the server 108 acquires (or calculates) based on information on the locations of the electronic devices received from the electronic devices 102-1, 102-3, and 102-5 and information on the location of the external device 105. According to an embodiment, the information indicating that at least one electronic device is positioned within the predetermined area may be acquired (or calculated) based on information on the locations of the electronic devices received from the server 108 by the electronic devices 102-1, 102-3, and 102-5 and information on the location of the external device 105.

Figure 11:
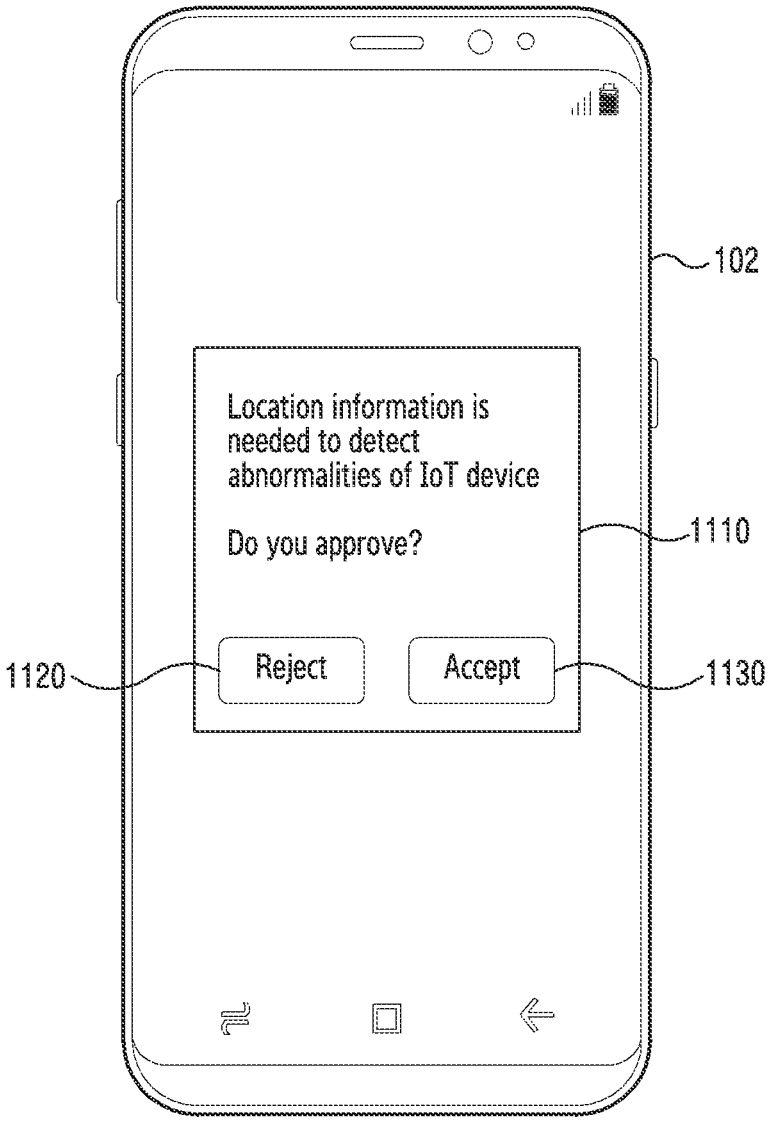
FIG. 11 is a diagram illustrating an example method of displaying consent to collection of the location of the electronic device received from the server according to various embodiments of the present disclosure.

FIG. 11 is a diagram illustrating an example method of displaying a request for consenting to collection of the location of the electronic device received from the server according to various embodiments of the present disclosure.

Referring to FIG. 11, according to an embodiment, the electronic device 102 may receive a request for consent (user consent) to collection of information related to the location of the electronic device from the server 108. According to an embodiment, the electronic device 102 may receive information on at least one of an application to use the information related to the location of the electronic device 102, the reason why the information related to the location of the electronic device 102 is needed, and a device to use the information related to the location of the electronic device 102 together with the consent to collection of the information related to the location of the electronic device 102 from the server 108, and may display the received information through the display (for example, the display device 160).

For example, in FIG. 11, the electronic device 102 may output the phrase "Location information is required to detect abnormalities of an IoT device. Do you approve it?" through a pop-up window 1110.

According to an embodiment, in response to reception of, from the user, input for an object 1130 (or a button) related to the input for accepting the request for consent to collection of the information related to the location of the electronic device 102 from the server 108, the electronic device 102 may transmit information indicating the consent to collection of the information related to the location of the electronic device 102 to the server 108.

According to an embodiment, in response to reception of, from the user of the electronic device 102, the input for an object 1120 related to input for rejecting the request for consent to collection of the information related to the location of the electronic device 102 from the server 108, the electronic device 102 may not transmit information on the consent to collection of the information related to the location of the electronic device 102 to the server 108. According to an embodiment, when the input for rejecting the request for consent to collection of the information related to the location of the electronic device 102 from the server 108 is received from the user (or when input for accepting the collection is not received), the electronic device 102 may identify whether the electronic devices 102-1, 102-3, and 102-5 output the status (or a change in the status) of the external device 105 based on at least one of, for example, the age, gender, position, or role of the users of the electronic device 102 and at least one external electronic device, whether the electronic device 102 is the master electronic device 102-1, the security level set in the external device 105, and attributes of the status of the external device 105 except for the information related to the location of the electronic device 102. However, the present disclosure is not limited thereto.

Figure 12:
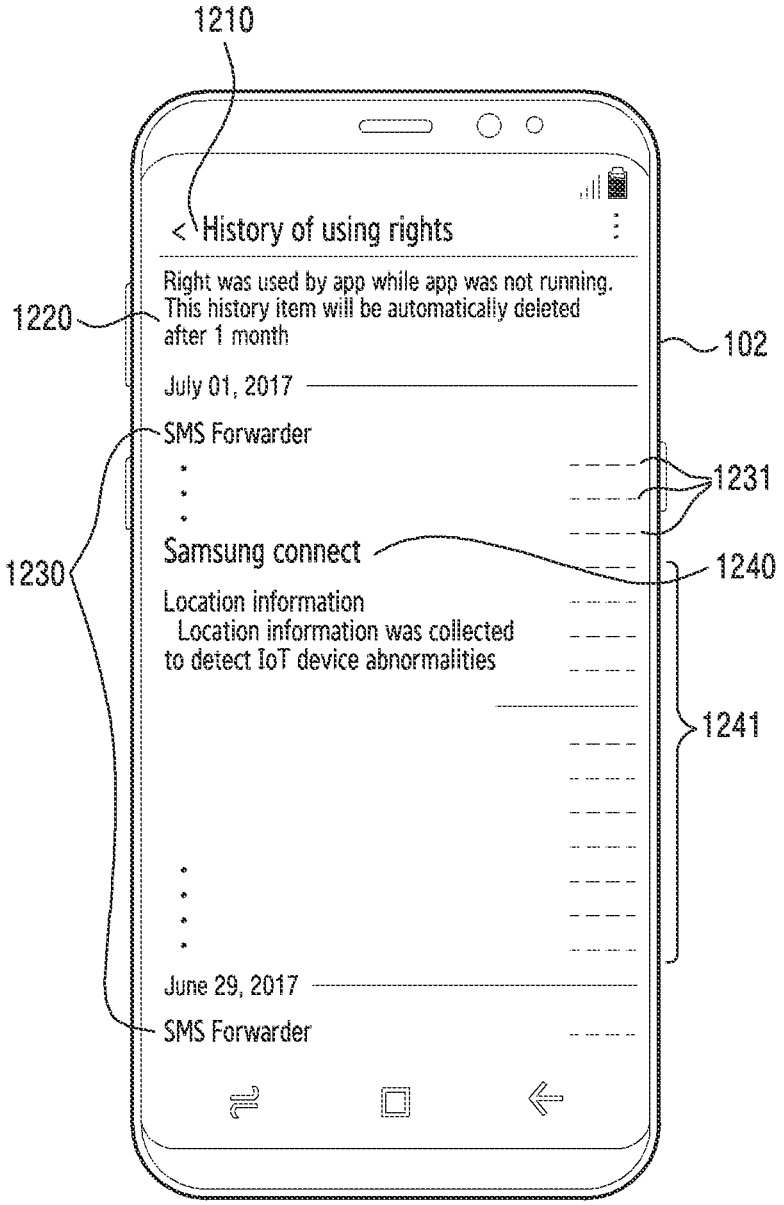
FIG. 12 is a diagram illustrating an example method of showing a history of the location of the electronic device collected by the server according to various embodiments of the present disclosure.

FIG. 12 is a diagram illustrating an example method by which the server indicates a history of collection of the location of the electronic device in the electronic device according to various embodiments of the present disclosure.

Referring to FIG. 12, according to an embodiment, the electronic device 102 may receive the request for consent to collection of the information related to the location of the electronic device 102 from the server 108 at the time point at which an application for controlling the external device 105 is installed. The electronic device 102 may receive, from the user, input for consenting (or accepting) the request from the server 108 and transmit information indicating the received input to the server 108. According to an embodiment, when the electronic device 102 transmits the input for consenting to the request of the server 108 received from the user to the server 108 and then receives information related to the location of the electronic device from the server 108, the electronic device 102 may transmit the information related to the location of the electronic device 102 to the server 108 without receiving the input for consenting to the request for the information related to the location of the electronic device 102 from the user of the electronic device 102 again. For example, when the electronic device 102 transmits the input for consenting to the request of the server 108 received from the user to the server 108 and then receives the request for information related to the location of the electronic device from the server 108, the electronic device 102 may transmit the information related to the location of the electronic device 102 to the server 108 without displaying the received request for the location information (in the background).

According to an embodiment, the processor 120 may store the request for information related to the location of the electronic device 102 from the server 108 or a history related to transmission of information related to the location of the electronic device 102 to the server 108 in the memory 130.

According to an embodiment, as illustrated in FIG. 12, the electronic device 102 may store, in the memory 130, a display 1210 indicating a history of a request (or a history received from the electronic device) for information related to the location of the electronic device 102 from the server 108, a display 1220 indicating that the server 108 made a request for information related to the location of the electronic device 102 and indicating that the stored history has been deleted within a predetermined period (for example, 1 month), applications 1230 and 1240 (or servers 108) making a request for information related to the location of the electronic device 102, and time (or a date and time) 1231 and 1241 at which the applications making the request for the information related to the location of the electronic device 102 make the request for information related to the location of the electronic device 102. The electronic device 102 may display a screen as illustrated in FIG. 12 in response to user input for displaying the stored history.

Figure 13:
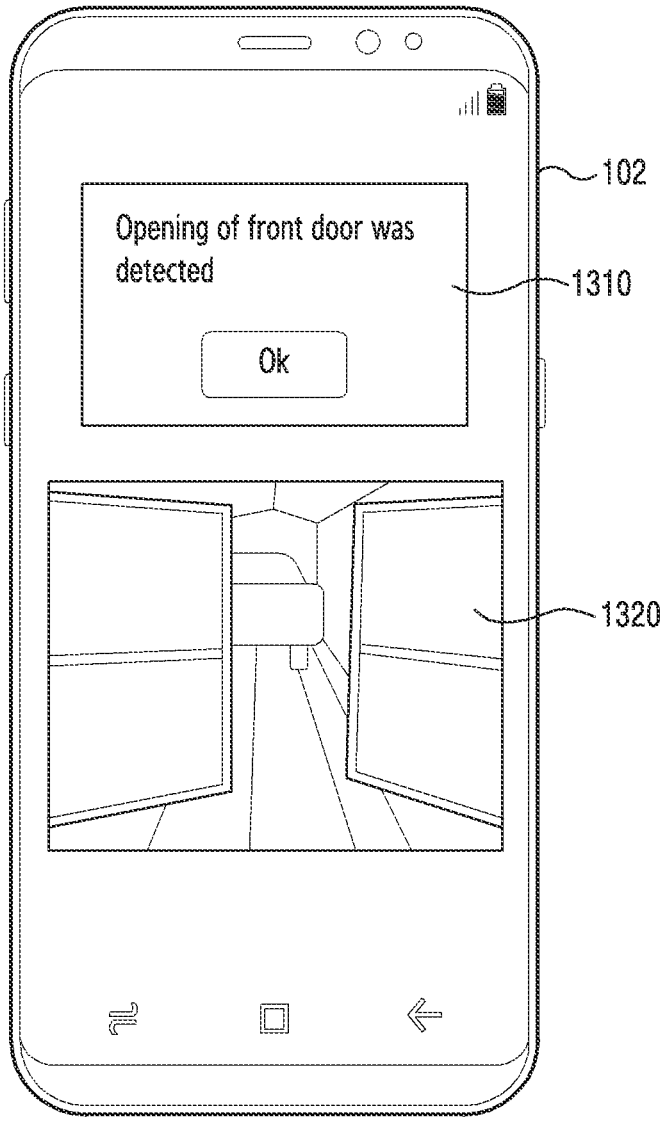
FIGS. 13 and 14 are diagrams illustrating examples of a scheme in which the electronic device outputs the status of the external device according to various embodiments of the present disclosure.
Figure 14:
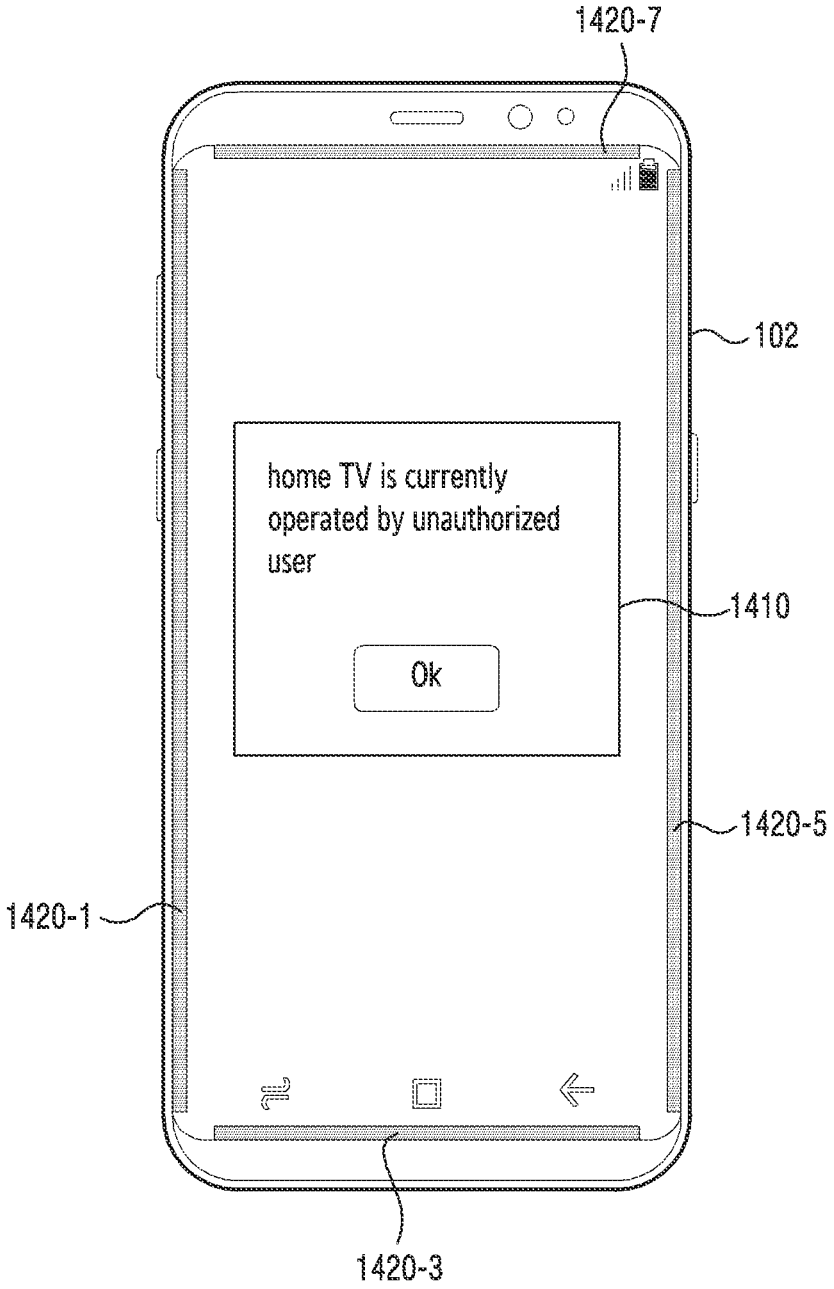

FIGS. 13 and 14 are diagrams illustrating examples of a scheme in which the electronic device outputs the status of the external device according to various embodiments of the present disclosure.

According to an embodiment, the scheme for outputting the status of the external device 105 may be set based on at least one of a type of the external device 105, a security level set in the external device 105, and attributes of the status of the external device 105.

For example, as illustrated in FIG. 13, when the electronic device 102 identifies that the external device 105 is a door lock (or a front door) having security level 3 and receive information on a change in the door lock (for example, a change in the door lock from a closed state to an open state), the electronic device 102 may output the phrase "opening of front door was detected" as a phrase indicating the change in the door lock from the closed state to the open state through a pop-up window 1310. According to an embodiment, the electronic device 102 may output an image 1320 generated by photographing the status of the door lock through the CCTV closest to the door lock together with the phrase. However, the present disclosure is not limited thereto.

In another example, as illustrated in FIG. 14, when the external device 105 (for example, a television) is controlled by an electronic device of an unauthorized user (for example, a user who is not included in the electronic device group), the electronic device 102 may output a phrase indicating that the television is controlled by the electronic device of the unauthorized user through a pop-up window 1410 and output light 1420-1, 1420-3, 1420-5 and 1420-7 in an edge area of the display (for example, the display device 160) of the electronic device 102. However, the present disclosure is not limited thereto. For example, the electronic device 102 may output an effect (for example, an edge-lighting function) for showing light as if the light were moving in the edge area (or part) of the display (or as if the light turned around the edge area).

Figure 15A:
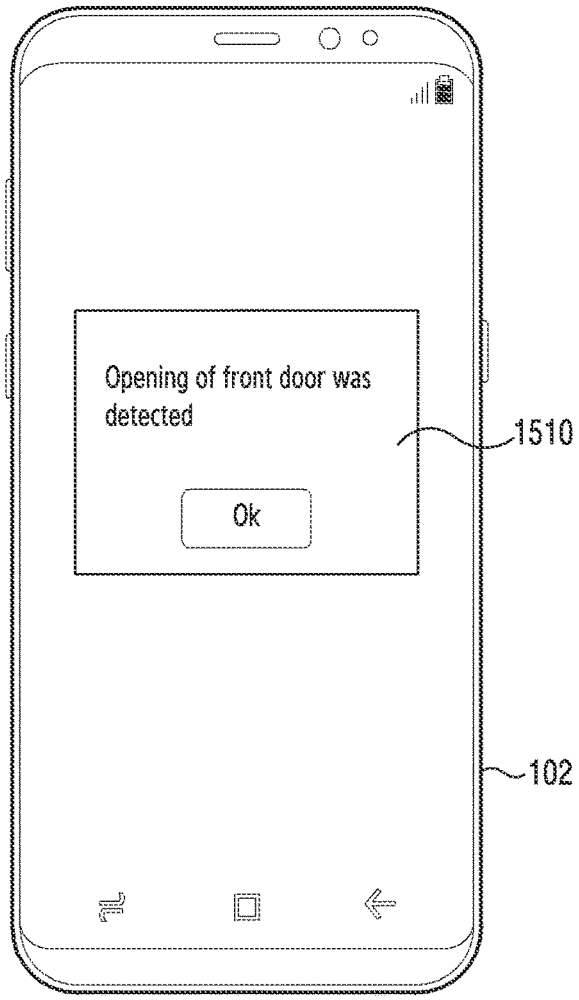
FIGS. 15A and 15B are diagrams illustrating an example method in which electronic devices output information on the status of the external device in a predetermined order according to various embodiments of the present disclosure.
Figure 15B:
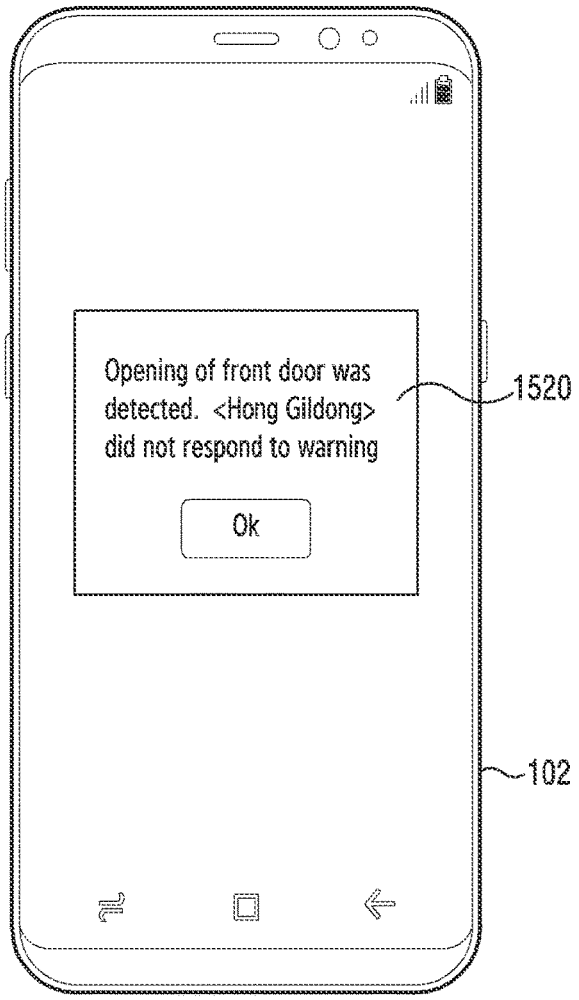

FIGS. 15A and 15B are diagrams illustrating an example method in which electronic devices output information on the status of the external device in a predetermined order according to various embodiments of the present disclosure.

Referring to FIGS. 15A and 15B, according to an embodiment, the electronic devices 102-1, 102-3, and 102-5 may identify that the electronic devices 102-1, 102-3, and 102-5 output information on the status of the external device 105 in a predetermined order based on at least one of the age, gender, position, or role of the users of the electronic devices 102-1, 102-3, and 102-5, whether the electronic device 102 is the master electronic device 102-1, the security level set in the external device 105, and attributes of the status of the external device 105.

According to an embodiment, the electronic devices 102-1, 102-3, and 102-5 may identify that the electronic devices 102-1, 102-3, and 102-5 sequentially output the status of the external device 105 in sequence from the electronic device closer to the external device 105 based on at least one part of the information related to the location. For example, FIG. 15A illustrates a screen output in the electronic device 102 which is identified to first output the status of the external device 105. As illustrated in FIG. 15A, the electronic device which is identified to first output the status of the external device 105 may display a phrase indicating a change of the door lock (or front door) from the closed state to the open state through a pop-up window 1510.

In another example, when the preceding electronic device does not output the status of the external device 105 or does not receive input for identifying the output status of the external device from the user, the electronic device 102 may determine to output the status of the external device 105. According to an embodiment, when the preceding electronic device does not output the status of the external device 105 or does not receive input for identifying the status of the external device 105, the electronic device 102 may further output information 1520 indicating that the preceding electronic device does not output the status of the external device 105 or does not receive input for identifying the output status of the external device 105 from the user together with the information related to the location of the external device 105. However, the present disclosure is not limited thereto.

A method of providing a notification by the electronic device 102 according to various embodiments of the present disclosure may include an operation of receiving information on a status of at least one external device 105, information related to a location of the electronic device 102, and information related to a location of at least one external electronic device from the server 108, an operation of identifying whether to output the status of the at least one external device 105, based at least in part on the information related to the location of the electronic device 102 and the information related to the location of the at least one external electronic device 105, and an operation of outputting the status of the at least one external device 105 in response to identification of the output of the status of the at least one external device 105.

According to various embodiments, the operation of identifying whether to output the status of the at least one external device 105 may include an operation of identifying whether to output the status of the at least one external device 105, based at least in part on a distance between the location of the electronic device 102 and the location of the at least one external device 105 and a distance between the location of the at least one external electronic device and the location of the at least one external device 105.

According to various embodiments, the operation of identifying whether to output the status of the at least one external device 105 may include an operation of identifying the electronic device 102 or the at least one electronic device closest to the at least one external device 105 and an operation of identifying that the identified electronic device 102 or at least one electronic device outputs the status of the at least one external device 105.

According to various embodiments, the operation of identifying whether to output the status of the at least one external device 105 may include an operation of, when it is identified that the at least one external electronic device is positioned within a predetermined area including the location of the at least one external device 105, determining not to output the status of the at least one external device 105.

According to various embodiments, the operation of identifying whether to output the status of the at least one external device 105 may include an operation of identifying a sequence in which the electronic device 102 and the at least one external electronic device outputs the status of the at least one external device 105, based at least partially on the information related to the location of the electronic device 102 and the information related to the location of the at least one external electronic device.

According to various embodiments, the operation of identifying whether to output the status of the at least one external device 105 may include an operation of, when the at least one external electronic device does not output the status of the at least one external device 105 or does not receive input for identifying the output of the status of the at least one external device 105 from the user of the at least one external device 105, identifying that the electronic device 102 outputs the status of the at least one external electronic device According to various embodiments, the method may further include an operation of generating a group master secret key to be shared between the electronic device 102 and the at least one external electronic device, an operation of receiving a request for the information related to the electronic device 102 from the server 108, an operation of generating a group session key through the group master secret key in response to reception of the request, an operation of encrypting the information related to the location of the electronic device 102 through the group session key, and an operation of transmitting the encrypted information to the server 108.

According to various embodiments, the operation of generating the group master secret key may include an operation of generating the group master secret key through a Group Diffie-Hellman algorithm used by the electronic device 102 and the at least one external electronic device or generating the group master secret key through a parameter generated by one of the electronic device 102 and the at least one external electronic device.

According to various embodiments, the operation of outputting the status of the at least one external device 105 may include an operation of identifying a scheme for outputting the status of the at least one external electronic device, based at least in part on at least one of a security level set in the at least one external device 105 and attributes of the status of the at least one external device 105.

According to various embodiments, the operation of identifying whether to output the status of the at least one external device 105 may include an operation of identifying whether to output the status of the at least one external device 105, based on at least one of ages, genders, positions, or roles of users of the electronic device 102 and the at least one external electronic device, whether the electronic device is an electronic device capable of assigning a right to control the at least one external electronic device to the at least one external electronic device, a security level set in the at least one external device 105, and attributes of the status of the external device 105.

Further, a structure of data used in the embodiments of the present disclosure may be recorded in a computer-readable recording medium through various means. The computer-readable recording medium includes a magnetic storage medium (for example, a ROM, a floppy disk, and a hard disk) and an optical reading medium (for example, a CD-ROM and a DVD).

According to an embodiment, a computer-readable recording medium may record a program for performing an operation of receiving information on a status of at least one external device 105, information related to a location of the electronic device 102, and information related to a location of at least one external electronic device from the server 108 by the electronic device 102, an operation of identifying whether to output the status of the at least one external device 105, based at least partially on the information related to the location of the electronic device 102 and the information related to the location of the at least one external electronic device 105, and an operation of outputting the status of the at least one external device 105 in response to identification of the output of the status of the at least one external device 105.

The present disclosure has been discussed above in connection with the various example embodiments thereof. It will be understood by those skilled in the art to which the present disclosure pertains that the present disclosure may be implemented in modified forms without departing from the essential characteristics of the present disclosure. Therefore, the example embodiments disclosed herein should be considered to be illustrative, not limiting. The scope of the present disclosure includes the accompanying claims, and all differences falling within the scope equivalent to the claims should be understood as being included in the present disclosure.

What is claimed is:

1. An electronic device comprising:

an output device;

a communication interface comprising communication circuitry; [a processor] *at least one processor* electrically connected to the communication interface and the output device; and a memory electrically connected to the *at least one* processor, wherein the memory stores instructions which, when executed by the *at least one* processor, *individually and/or collectively,* cause the electronic device to:

receive information on a status of at least one external device, information related to a location of the electronic device, and information related to a location of at least one another electronic device from a server through the communication interface, wherein the external device is a device disposed within a fixed area, and the electronic device or the another electronic device is a portable device, and wherein the external device is a device which can be controlled by the electronic device or the another electronic device, identify whether to output the received status of the at least one external device to a user of the electronic device using the output device of the electronic device, based at least in part on the information related to the location of the electronic device and the information related to the location of the at least one another electronic device, and output the received status of the at least one external device to the user of electronic device using the output device of the electronic device in response to identification of the output of the status of the at least one external device.

2. The electronic device of claim 1, wherein the instructions, when executed by the *at least one* processor, cause the electronic device to identify whether to output the status of the at least one external device, based at least in part on a distance between the location of the electronic device and the location of the at least one external device and a distance between the location of the at least one another electronic device and the location of the at least one external device.

3. The electronic device of claim 2, wherein the instructions, when executed by the *at least one* processor, cause the electronic device to:

identify whether the electronic device or the at least one *another* electronic device is closer to the at least one external device, and identify that the identified electronic device or at least one *another* electronic device that is closer to the at least one external device outputs the status of the at least one external device.

4. The electronic device of claim 2, wherein, the instructions, when executed by the *at least one* processor, cause the electronic device to determine to not output the status of the at least one external device when it is identified that the at least one another electronic device is positioned within a predetermined area including the location of the at least one external device.

5. The electronic device of claim 1, wherein the instructions, When executed by the *at least one* processor, cause the electronic device to identify a sequence in Which the electronic device and the at least one another electronic device output the status of the at least one external device based at least in part on the information related to the location of the electronic device and the information related to the location of the at least one another electronic device.

6. The electronic device of claim 5, wherein the instructions, when executed by the *at least one* processor, cause the electronic device to:

identify a sequence in which the at least one another electronic device outputs the status of the at least one [another electronic] *external* device earlier than the electronic device, and identify that the electronic device outputs the status of the at least one [another electronic] *external* device when the at least one another electronic device does not output the status of the at least one external device or does not receive input for identifying the output of the status of the at least one external device from a user of the at least one [external] *another electronic* device.

7. The electronic device of claim 1, wherein the instructions, when executed by the *at least one* processor, cause the electronic device to:

generate a group master secret key to be shared between the electronic device and the at least one another electronic device, receive a request for the information related to the electronic device from the server, generate a group session key through the group master secret key in response to reception of the request, encrypt the information related to the location of the electronic device through the group session key, and control the communication interface to transmit the encrypted information to the server.

8. The electronic device of claim 7, wherein the instructions, when executed by the *at least one* processor, cause the electronic device to generate the group master secret key through a Group Diffie-Hellman algorithm used by the electronic device and the at least one another electronic device or to generate the group master secret key through a parameter generated by one of the electronic device and the at least one another electronic device.

9. The electronic device of claim 1, wherein the instructions, when executed by the *at least one* processor, cause the electronic device to identify a scheme for outputting the status of the at least one another electronic device based at least in part on at least one of a security level set in the at least one external device and attributes of the status of the at least one external device.

10. The electronic device of claim 1, wherein the instructions, when executed by the *at least one* processor, cause the electronic device to identify whether to output the status of the at least one external device based on at least one of: ages, genders, positions, and/or family roles of users of the electronic device and the at least one another electronic device, whether the electronic device is an electronic device capable of assigning a right to manage the at least one another electronic device to the at least one another electronic device, a security level set in the at least one external device, and attributes of the status of the external device.

11. A method performed by an electronic device including an output device for providing a notification by the electronic device, the method comprising:

receiving information on a status of at least one external device, information related to a location of the electronic device, and information related to a location of at least one another electronic device from a server, wherein the external device is a device disposed within a fixed area and the electronic device or the another electronic device is a portable device, and wherein the external device is a device which can be controlled by the electronic device or the another electronic device;

identifying whether to output the received status of the at least one external device to a user of the electronic device using the output device of the electronic device, based at least in part on the information related to the location of the electronic device and the information related to the location of the at least *one* another electronic device; and outputting the received status of the at least one external device to the user of electronic device using the output device of the electronic device in response to identification of the output of the status of the at least one external device.

12. The method of claim 11, wherein the identifying of whether to output the status of the at least one external device comprises identifying whether to output the status of the at least one external device, based at least in part on a distance between the location of the electronic device and the location of the at least one external device and a distance between the location of the at least one another electronic device and the location of the at least one external device.

13. The method of claim 12, wherein the identifying of whether to output the status of the at least one external device comprises:

identifying whether the electronic device or the at least one *another* electronic device is closer to the at least one external device; and identifying that the identified electronic device or at least one *another* electronic device that is closer to the at least one external device outputs the status of the at least one external device.

14. The method of claim 12, wherein the identifying of whether to output the status of the at least one external device comprises, determining to not output the status of the at least one external device upon identification that the at least one another electronic device is positioned within a predetermined area including the location of the at least one external device.

15. The method of claim 11, wherein the identifying of whether to output the status of the at least one external device comprises identifying a sequence in which the electronic device and the at least one another electronic device output the status of the at least one external device based at least in part on the information related to the location of the electronic device and the information related to the location of the at least one another electronic device.

16. The method of claim 15, wherein the identifying of whether to output the status of the at least one external device comprises, identifying that the electronic device outputs the status of the at least one [another electronic] *external* device when the at least one another electronic device does not output the status of the at least one external device or does not receive an input for identifying the output of the status of the at least one external device from a user of the at least one [external] *another electronic* device.

17. The method of claim 11, further comprising:

generating a group master secret key to be shared between the electronic device and the at least one another electronic device;

receiving a request for the information related to the electronic device from the server;

generating a group session key through the group master secret key in response to reception of the request;

encrypting the information related to the location of the electronic device through the group session key; and transmitting the encrypted information to the server.

18. The method of claim 17, wherein the generating of the group master secret key comprises generating the group master secret key through a Group Diffie-Hellman algorithm used by the electronic device and the at least one another electronic device or generating the group master secret key through a parameter generated by one of the electronic device and the at least one another electronic device.

19. The method of claim 11, wherein the outputting of the status of the at least one external device comprises identifying a scheme for outputting the status of the at least one another electronic device based at least in part on at least one of a security level set in the at least one external device and attributes of the status of the at least one external device.

20. The method of claim 11, wherein the identifying of whether to output the status of the at least one external device comprises identifying whether to output the status of the at least one external device based on at least one of: ages, genders, positions, and/or roles of users of the electronic device and the at least one another electronic device, whether the electronic device is an electronic device capable of assigning a right to manage the at least one another electronic device to the at least one another electronic device, a security level set in the at least one external device, and attributes of the status of the external device.

*21. A system comprising:*

*a first mobile terminal; and*

*a server communicatively connected to the mobile terminal and comprising:*

*a communication interface comprising communication circuitry configured to communicate with the first mobile terminal and a second mobile terminal; and*

*at least one first processor operatively coupled to the communication interface and configured, individually and/or collectively, to:*

*receive location information of the first mobile terminal from the first mobile terminal communicatively connected to the server and location information of the second mobile terminal from the second mobile terminal communicatively connected to the server, wherein the first mobile terminal corresponds to a first user account and wherein a first electronic device group including the first mobile terminal and the second mobile terminal is assigned a control right for at least one first home appliance registered with the first user account,*

*in response to determining that a change in an operating state of the at least one first home appliance includes a first pattern, transmit information on the operating state of the at least one first home appliance received from the at least one first home appliance to the first mobile terminal and the second mobile terminal, and*

*in response to determining that the change in an operating state of the at least one first home appliance includes a second pattern different from*

*the first pattern, determining not to transmit the information on the operating state of the at least one first home appliance received from the at least one first home appliance to the first mobile terminal and the second mobile terminal,*

*wherein the second mobile terminal corresponds to a second user account registered in the server by the first user account,*

*wherein the at least one first home appliance is a device which can be controlled by the first mobile terminal and/or the second mobile terminal,*

*wherein the first mobile terminal comprises:*

*an output device;*

*a communication interface comprising communication circuitry;*

*at least one second processor electrically connected to the communication interface and the output device; and*

*a memory electrically connected to the at least one second processor, wherein the memory stores instructions which, when executed by the at least one second processor, individually and/or collectively, cause the mobile terminal to:*

*transmit location information of the first mobile terminal to the server,*

*receive information on a status of the at least one first home appliance from the server through the communication interface, and information related to a location of the second mobile terminal, from the server through the communication interface, and wherein the at least one first home appliance is a device disposed Within a fixed area, and the first mobile terminal is a portable device,*

*identify whether to output the received status of the at least one first home appliance to a user of the first mobile terminal using the output device of the first mobile terminal, based at least in part on the information related to the location of the first mobile terminal and the information related to the location of the second mobile terminal, and*

*output the received status of the at least one first home appliance to the output device of the first mobile terminal in response to the identification of the output of the status of the at least one first home appliance.*

*22. The system of claim 21,*

*wherein the second user account of the second mobile terminal and the at least one first home appliance are registered in the server by the first user account through a designated registration procedure of an application of the first mobile terminal for controlling the at least one first home appliance, and*

*wherein the second mobile terminal is a terminal that is assigned, from the first mobile terminal, a right to receive the information on the operating state of the at least one first home appliance.*

*23. The system of claim 21, wherein the at least one first processor is further configured to, in response to determining that the location information of the first mobile terminal satisfies a specified condition, transmit information on an operating state of at least one second home appliance received from the at least one second home appliance registered by the first user account to a third mobile terminal,*

*wherein the third mobile terminal corresponds to a third user account registered in the server by the first user account, and*

*wherein a second electronic device group including the first mobile terminal and the third mobile terminal is assigned a control right for the at least one second home appliance.*

*24. The system of claim 23, wherein the control right for the at least one first home appliance assigned to mobile terminals included in the first electronic device group and the control right for the at least one second home appliance assigned to mobile terminals included in the second electronic device group are different.*

*25. The system of claim 21, wherein the at least one first processor is further configured to, in response to determining that the location information of the first mobile terminal satisfies a specified condition and that a change in the operating state of the at least one first home appliance includes the first pattern, transmit the information on the operating state of the at least one first home appliance to the second mobile terminal so that the second mobile terminal outputs a notification on the operating state of the at least one first home appliance on a display,*

*wherein the notification on the operating state of the at least one first home appliance comprises information on a type of home appliance in which a change in operating state occurred and information on changes in operating state that occurred in home appliance.*

*26. The system of claim 21, wherein the information on the operating state of the at least one first home appliance is information included in a response signal transmitted by the at least one first home appliance to the server in response to the at least one first home appliance receiving a control signal from the server.*

*27. The system of claim 21, wherein the at least one first processor is further configured to:*

*determine whether to transmit the information on the operating state of the at least one first home appliance to the second mobile terminal, and*

*in response to the determination, transmit the information on the operating state of the at least one first home appliance to the second mobile terminal.*

*28. The system of claim 21, wherein the at least one first processor is further configured to:*

*request the first mobile terminal to consent to a collection of the location information of the first mobile terminal, and*

*in response to receiving information indicating consent to the collection of the location information from the first mobile terminal, receive the location information of the first mobile terminal from the first mobile terminal.*

* * * * *